(12) United States Patent
Kato et al.

(10) Patent No.: US 7,018,514 B2
(45) Date of Patent: Mar. 28, 2006

(54) METHOD AND APPARATUS FOR PROCESSING SUBSTANCES TO BE DECOMPOSED

(75) Inventors: Kinya Kato, Kanagawa (JP); Masahiro Kawaguchi, Kanagawa (JP); Akira Kuriyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 513 days.

(21) Appl. No.: 10/292,402

(22) Filed: Nov. 12, 2002

(65) Prior Publication Data

US 2003/0089595 A1   May 15, 2003

(30) Foreign Application Priority Data

Nov. 12, 2001   (JP)   ............... 2001-346168

(51) Int. Cl.
 B01D 53/00   (2006.01)
 A62D 3/00   (2006.01)
(52) U.S. Cl. .................... 204/157.3; 588/313
(58) Field of Classification Search ............ 204/157.3; 588/313
See application file for complete search history.

(56) References Cited

U.S. PATENT DOCUMENTS

| | | | |
|---|---|---|---|
| 3,649,493 A | 3/1972 | Meiners et al. ........... 204/157.1 |
| 4,009,099 A | 2/1977 | Jeris ............................. 210/3 |
| 4,110,183 A * | 8/1978 | Furuta et al. ............ 204/157.3 |
| 4,236,992 A | 12/1980 | Themy ....................... 204/278 |
| 4,361,471 A | 11/1982 | Kosarek ...................... 210/128 |
| 4,555,323 A | 11/1985 | Collier ....................... 204/258 |
| 4,761,208 A | 8/1988 | Gram et al. .................. 204/95 |
| 4,927,621 A | 5/1990 | Repman et al. ............. 423/488 |
| 5,039,383 A | 8/1991 | Spotnitz et al. ............. 204/128 |
| 5,260,036 A | 11/1993 | Weigold et al. ........... 422/186.3 |
| 5,340,555 A | 8/1994 | Mashio et al. ........... 423/240 R |
| 5,370,740 A | 12/1994 | Chao et al. ..................... 134/1 |
| 5,393,394 A | 2/1995 | Ikeda et al. ............... 204/158.2 |
| 5,460,792 A | 10/1995 | Rosenbaum ............. 423/245.3 |
| 5,494,574 A | 2/1996 | Unterman et al. .......... 210/150 |
| 5,525,008 A | 6/1996 | Wilson ....................... 405/128 |
| 5,578,193 A | 11/1996 | Aoki et al. ................. 205/746 |
| 5,582,741 A | 12/1996 | Kenmoku et al. .......... 210/748 |
| 5,611,642 A | 3/1997 | Wilson ....................... 405/128 |
| 5,616,234 A * | 4/1997 | Rhees et al. ................ 205/500 |
| 5,714,665 A | 2/1998 | Ohtake et al. .............. 588/204 |

(Continued)

FOREIGN PATENT DOCUMENTS

DE   43 30 518 A1   3/1995

(Continued)

OTHER PUBLICATIONS

Water Processing Technology, vol. 37, No. 5, pp. 241-250 (1996) (with translation), no month.

(Continued)

Primary Examiner—Edna Wong
(74) Attorney, Agent, or Firm—Fitzpatrick, Cella, Harper & Scinto

(57) ABSTRACT

A method for processing substances to be degraded is provided. The method includes a decomposing step in which a mixed gas containing chlorine and the substances to be degraded is irradiated with light to decompose the substances to be degraded, a contact step in which gas generated through the decomposing step is contacted with an alkaline solution to trap chlorine contained in the gas generated through the decomposing step in the alkaline solution, and a reusing step in which the alkaline solution containing the chlorine as a source of generating the chlorine is used again in the decomposing step.

8 Claims, 9 Drawing Sheets

U.S. PATENT DOCUMENTS

| | | | |
|---|---|---|---|
| 5,832,361 A | 11/1998 | Foret | 422/186 |
| 5,980,727 A | 11/1999 | Putz et al. | 205/688 |
| 6,238,628 B1 | 5/2001 | Matsutani | 422/172 |
| 6,444,015 B1 | 9/2002 | Kato | 95/143 |
| 6,462,250 B1 | 10/2002 | Kuriyama et al. | 588/204 |
| 6,497,795 B1 | 12/2002 | Kato | 204/157.3 |
| 6,585,897 B1 | 7/2003 | Kato | 210/756 |
| 6,599,431 B1 | 7/2003 | Kawaguchi et al. | 210/748 |
| 6,610,178 B1 | 8/2003 | Kato et al. | 204/158.21 |
| 6,616,815 B1 | 9/2003 | Kato et al. | 204/158.21 |
| 2002/0008069 A1 | 1/2002 | Kato et al. | 210/748 |
| 2002/0017496 A1 | 2/2002 | Kuriyama et al. | 210/748 |
| 2002/0068845 A1 | 6/2002 | Kato et al. | 588/210 |
| 2002/0103409 A1 | 8/2002 | Kuriyama et al. | 588/227 |
| 2002/0189929 A1 | 12/2002 | Kato | 204/157.15 |
| 2003/0089594 A1 | 5/2003 | Kato et al. | 204/157.3 |
| 2003/0164286 A1 | 9/2003 | Kato et al. | 204/157.15 |
| 2003/0196886 A1 | 10/2003 | Kato et al. | 204/158.21 |

FOREIGN PATENT DOCUMENTS

| | | |
|---|---|---|
| DE | 44 00 308 A1 | 7/1995 |
| EP | 0 581 216 A1 | 2/1994 |
| EP | 0 841 305 A2 | 5/1998 |
| EP | 0 968 739 A1 | 1/2000 |
| EP | 1 005 881 A1 | 6/2000 |
| JP | 49-45027 | 4/1974 |
| JP | 51-23467 | 2/1976 |
| JP | 51031673 A * | 3/1976 |
| JP | 53148167 A * | 12/1978 |
| JP | 57-166175 | 10/1982 |
| JP | 60-261590 | 12/1985 |
| JP | 62-191025 | 8/1987 |
| JP | 62-191095 | 8/1987 |
| JP | 63-218293 | 9/1988 |
| JP | 1-180293 | 7/1989 |
| JP | 2-243501 | 9/1990 |
| JP | 3-38297 | 2/1991 |
| JP | 3-74507 | 3/1991 |
| JP | 5-115722 | 5/1993 |
| JP | 5-149127 | 6/1993 |
| JP | 5-269374 | 10/1993 |
| JP | 6-31135 | 2/1994 |
| JP | 6-71130 | 3/1994 |
| JP | 6-182151 | 7/1994 |
| JP | 6-246133 | 9/1994 |
| JP | 7-819 | 1/1995 |
| JP | 7-51675 | 2/1995 |
| JP | 7-144137 | 6/1995 |
| JP | 8-759 | 1/1996 |
| JP | 8-104665 | 4/1996 |
| JP | 8-141367 | 6/1996 |
| JP | 8-243351 | 9/1996 |
| JP | 8-257570 | 10/1996 |
| JP | 8-281271 | 10/1996 |
| JP | 9-10554 | 1/1997 |
| JP | 9-234338 | 9/1997 |
| JP | 9-299753 | 11/1997 |
| JP | 10-180040 | 7/1998 |
| JP | 2000-354642 | 12/2000 |
| JP | 2001-975 | 1/2001 |
| WO | WO 94/02423 | 2/1994 |
| WO | WO 94/03399 | 2/1994 |

OTHER PUBLICATIONS

"Present Status Groundwater/ Soil Contamination and Mangement," *Res. Inst. Env. Techn.* (1995) 220-227 (with translation), no month.

Ute Heinz et al., "Biodegradation of Dichloroacetic Acid by Entrapped and Absorptive Immobilized *Xanthobacter Autotrophicus* GJ10," 40 *Appl. Microbiol. Biotechnol.* 158-164 (1993), no month.

G. Huybrechts et al., "Gas-Phase Chlorine-Photosynthesized Oxidation of Trichloroethylene," 62 *Trans. Faraday Soc.* 2191-2199 (1962), no month.

K.L. Müller et al., "Die Photochemische Durch Chlor Sensibilisierte Oxydation von Trichloräthylen zu Dichloracetychlorid," B37 *H.Z. Phys. Chem.* 365-373 (1937) (With English Translation), no month.

* cited by examiner

METHOD AND APPARATUS FOR PROCESSING SUBSTANCES TO BE DECOMPOSED

BACKGROUND OF THE INVENTION

1. Field of the Invention

The present invention relates to a method of processing substances to be decomposed and also to an apparatus to be used for such a method, and more particularly to a method of decomposing substances to be decomposed and an apparatus to be used for such a method.

2. Related Background Art

With developing industries, a large amount of organochlorine compounds, such as chlorinated ethylene and chlorinated methano, have been used, and the disposal of such compounds has become a serious problem. In particular, gases of spent compounds are causing great concern over environmental pollution. Extensive efforts have been made to solve this problem.

For example, one of the methods that have been proposed to treat these compounds includes adsorbing contaminants such as organochlorine compounds in the natural environment on adsorbent such as activated carbon to remove the compounds from the environment. When activated carbon is used, the activated carbon that has adsorbed contaminants may be incinerated and reclaimed, or the activated carbon may be heated with steam for reclamation and the liquid containing the contaminants is recovered.

Methods for decomposing those compounds include a method for decomposing chlorinated ethylene with an oxidizing agent or catalyst. More particularly, a method for decomposing the compounds with ozone and a method for decomposing the compounds by irradiating ultraviolet rays in the presence of hydrogen peroxide are known. Also, the use of sodium hypochlorite as an oxidizing agent has been suggested. Moreover, there has been known a method for decomposing the compounds by irradiating an alkaline water suspension of photocatalytic fine particles composed of semiconductor oxide particles such as titanium oxide particles and liquid chlorinated ethylene with light.

Also, photolysis processes in which compounds are decomposed by irradiation with ultraviolet rays in a gaseous phase without using an oxidizing agent have been tried. For example, there is proposed a method in which exhaust gas containing an organohalogen compound is irradiated with ultraviolet rays thereby changing the compound into acidic decomposed gas, and then the same is washed with alkali to be made innoxious. There has also been proposed an apparatus in which drain containing organohalogen compound is aeration treated, and discharged gas generated through the aeration treatment is irradiated with ultraviolet rays and then washed with alkali. Also, a method for decomposing chlorinated ethylene with iron powder is known. In this method, it is assumed that a reducing decomposition is taking place. Also, a process for decomposing tetrachloroethylene (hereafter referred to as "PCE") using silicon fine particles has been proposed.

It is known that chlorinated aliphatic hydrocarbons such as trichloroethylene (hereafter referred to as "TCE") and PCE are decomposed by microorganisms aerobically or anaerobically, and there have been attempts to decompose such compounds and purify the natural environment by such a microbial process.

A variety of decomposition and purification apparatuses have been proposed to solve the problems associated with the methods and apparatuses mentioned above. For example, in one of such apparatuses, gas containing chlorine gas is mixed with organochlorine compounds in a gaseous phase to make a mixed gas, and the mixed gas is irradiated with light to decompose the organochlorine compounds.

In this example, a convenient and safe way of obtaining gas containing chlorine gas is to use chlorine gas that is generated from a chlorine-containing solution.

FIG. 1 schematically shows one example of an apparatus to generate chlorine gas. The apparatus includes a gap generation unit 11 that generate air containing chlorine gas, a water tank 12 that contains a solution containing chlorine gas, a pipe system 18 for blowing air into the solution, and a valve 14 for adjusting the amount of air. Air that passes through the aqueous liquid containing chlorine becomes to be air that contains chlorine gas, which is then introduced into a reaction vessel 5. The apparatus also includes a unit 1 that supplies substance to be degraded. The unit 1 introduces substance to be degraded into the reaction vessel 5, where the substance is mixed with the air containing chloride gas, irradiated with light by a light irradiation unit 4 for a predetermined period of time, and decomposed. After the decomposition, generated gas is discharged through an exhaust pipe 6. A chlorine solution that is contained in the water tank 12 may be a solution characterized by a hydrogen ion concentration (pH) between 1 and 4, and a residual chlorine concentration between 5 and 150 mg/L. Such a solution can be obtained by, for example, dissolving hypochlorite (e.g., sodium hypochlorite and potassium hypochlorite) in water. When an inorganic acid is contained in this solution, chlorine gas can be more effectively generated.

The above-described decomposition and purification apparatus for decomposing gaseous organochlorine compounds starts the decomposition reaction by mixing chlorine gas that is supplied from chlorine-containing water and gaseous organochlorine compounds that are substance to be degraded under light irradiation. However, not all of the chlorine gas is consumed by the decomposition reaction, but a major part of the chlorine gas is discharged intact. In other words, since a major part of the chlorine gas is discharged, only a small amount of chlorine among the entire chlorine is used for the decomposition reaction, and therefore the decomposition efficiency is believed to be lowered.

As described above, a number of methods for decomposing various organochlorine compounds have been proposed. However, it was found that most of these methods require complicated apparatuses for decomposition, and/or a further process to make the decomposition products harmless. Accordingly, there is still a demand for technology for decomposing organochlorine compounds with an eco-friendly, practical apparatus but without requiring special facility. In other words, there is still a strong demand for simpler and more effective methods for decomposing substances to be degraded and decomposition apparatuses to be used for such methods, as well as a strong demand for effective methods for decomposing substances to be degraded with a less drainage amount and without requiring a process using activated carbon or microorganisms or secondary environmental contamination, and apparatuses to be used for such methods.

SUMMARY OF THE INVENTION

The present invention provides a decomposition method and apparatus for decomposing substances to be degraded, which reduces discharge of chlorine into the natural environment and effectively uses chlorine. Also, the present invention provides a method and apparatus for collecting decomposition products that may be generated through decomposing substances to be degraded as a solution.

In accordance with an embodiment of the present invention, a method for processing substances to be degraded comprises a decomposing step of irradiating a mixed gas containing chlorine and the substances to be degraded with light to decompose the substances to be degraded, a step of contacting gas generated through the decomposing step with an alkaline solution to trap chlorine contained in the gas generated through the decomposing step into the alkaline solution, and a step of using the alkaline solution containing the chlorine as a source of generating the chlorine to be used in the decomposing step.

In accordance with another embodiment of the present invention, an apparatus for processing substances to be degraded comprises a decomposing process section that decomposes the substances to be degraded, a light irradiation unit that is located within the decomposing process section and irradiates a mixed gas containing chlorine and the substances to be degraded with light, a unit that contacts gas generated upon decomposition of the substances to be degraded with an alkaline solution to take chlorine contained in the gas generated upon decomposition of the substances to be degraded into the alkaline solution, and a unit that uses the alkaline solution containing the chlorine as a source of generating the chlorine to be used for decomposing the substances to be degraded.

Other objects, features and advantages of the invention will become apparent from the following detailed description taken in conjunction with the accompanying drawings.

DETAILED DESCRIPTION OF THE PREFERRED EMBODIMENTS

A basic structure of a decomposing/purification apparatus in accordance with an embodiment of the present invention will be described below with reference to FIG. 2.

[Decomposition Reaction]

(1) Apparatus Structure

Figure 1:
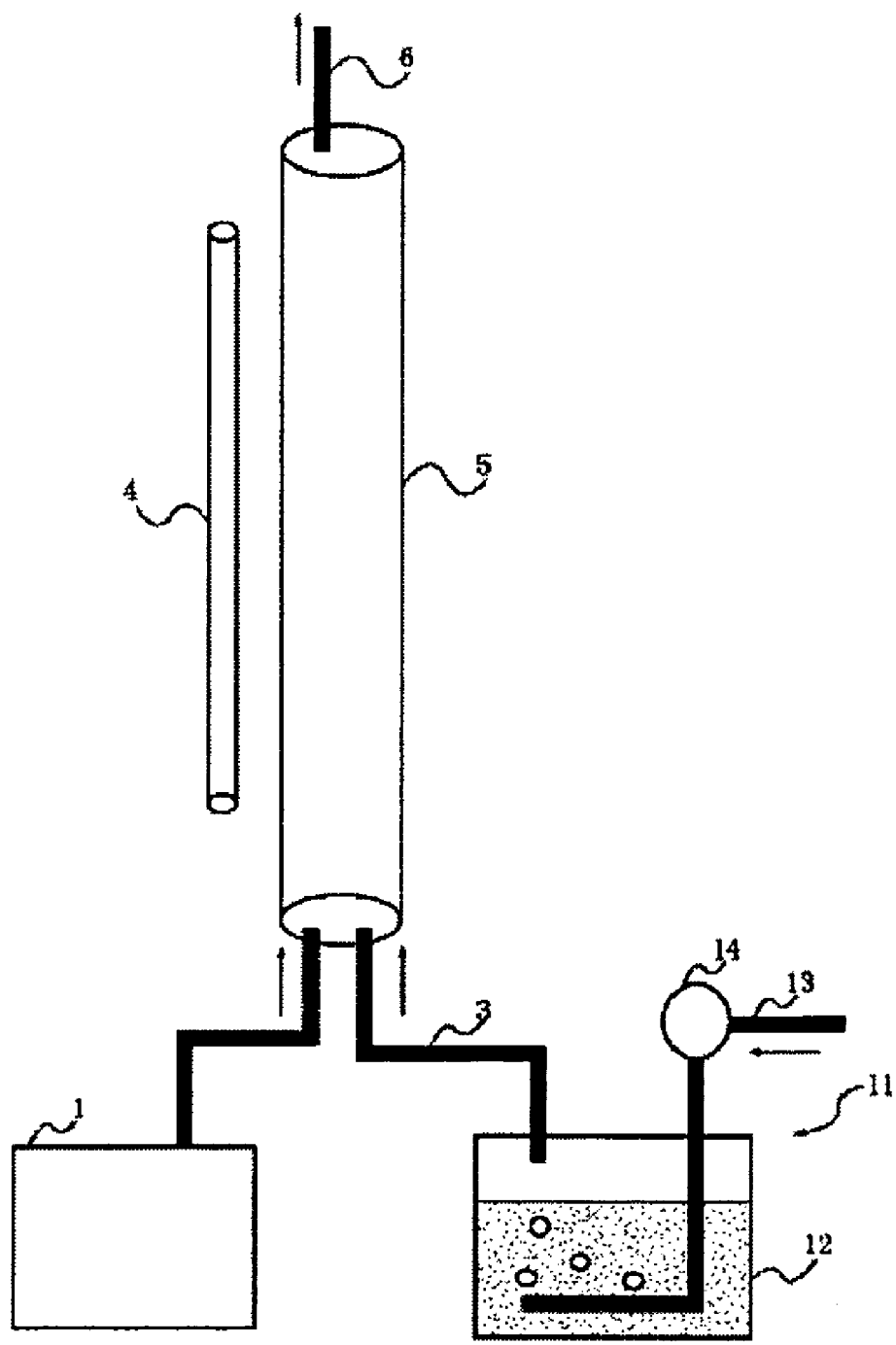
FIG. 1 is a schematic diagram of a conventional decomposing apparatus for decomposing substances to be degraded.
Figure 2:
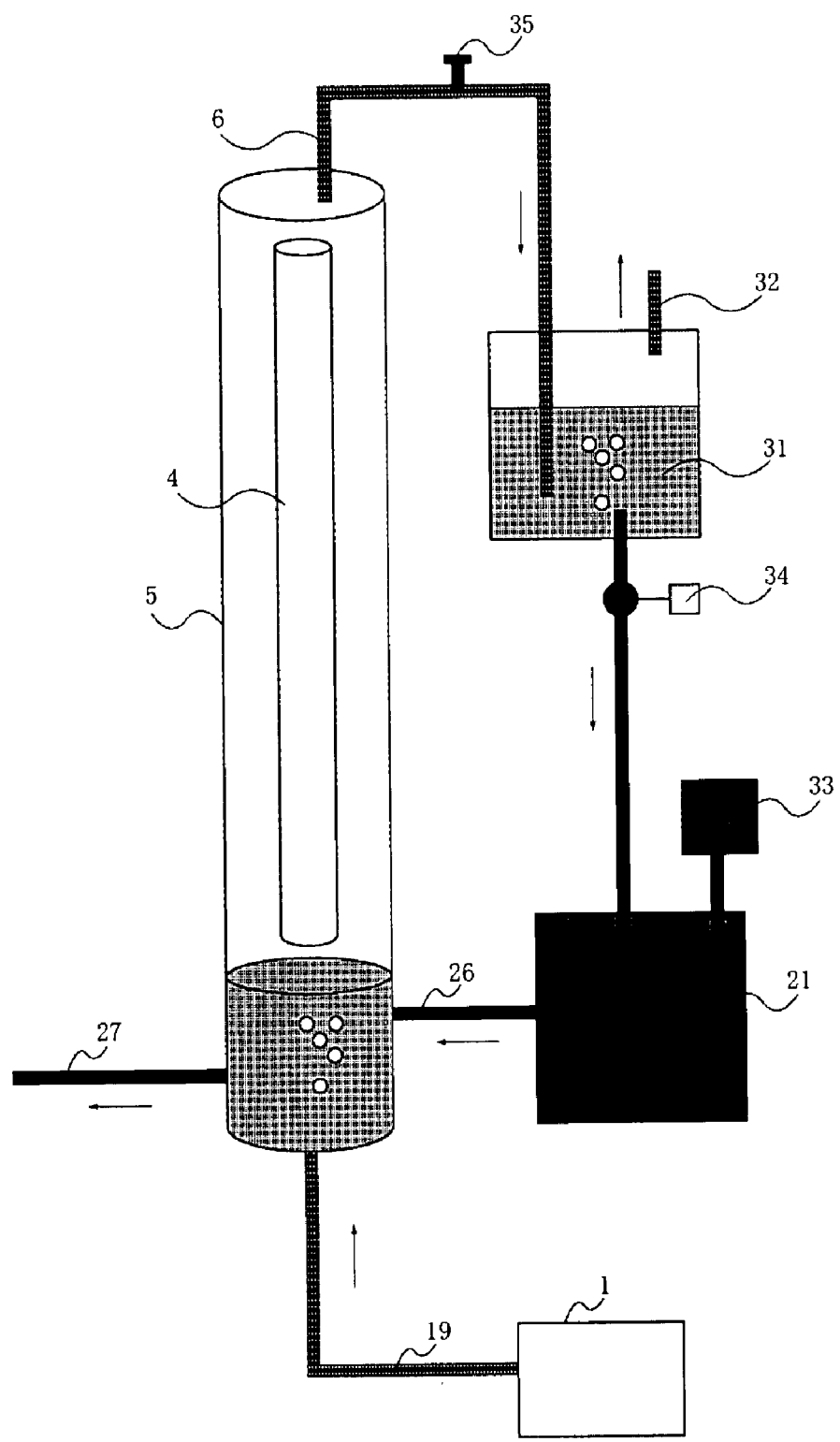
FIG. 2 is a schematic diagram of a decomposing apparatus for decomposing substances to be degraded in accordance with a first embodiment of the present invention.

Referring to FIG. 2, a decomposing/purification apparatus includes a reaction apparatus 5 which reserves at its bottom section a solution containing chlorine (i.e., chlorine solution). In an upper section of the reaction apparatus 5 that defines a gas phase section, air containing chlorine and substances to be degraded (e.g., gaseous organochlorine compounds) are mixed to form a mixed gas. A light irradiation unit 4 is provided within the reaction apparatus 5 to irradiate the mixed gas with light.

The gaseous organochlorine compounds to be degraded can be supplied from a target substance supply unit 1. The chlorine solution is continuously supplied into the bottom section of the reaction apparatus 6 at a controlled flow quantity through a pipe 26 from a chlorine solution tank 21. The chlorine solution can be adjusted at the chlorine solution tank 21 before it is supplied to the reaction apparatus 5. Gas to be aerated contains gaseous organochlorine compounds to be degraded and is continuously supplied into the bottom section of the reaction apparatus 5 at a controlled flow quantity through a supply pipe 19 from the target substance supply unit 1. As a result, the gas containing chlorine gas and the gaseous organochlorine compounds to be degraded form a mixed gas, and the mixed gas is discharged into the gas phase section in the upper section of the reaction apparatus 5. The mixed gas within the reaction apparatus 5 is irradiated with light by the light irradiation unit 4 such that the compounds to be degraded are decomposed.

(2) Chlorine Solution—Functional Water

A chlorine solution (functional water) that can be used for the present invention may preferably have characteristic properties showing, for example, a hydrogen ion concentration (pH value) between 1 and 4, more preferably between 2 and 3, and a residual chlorine concentration between 5 mg/liter and 300 mg/liter, more preferably between 30 mg/liter and 120 mg/liter.

More specifically, when a chlorine-containing air generation unit such as the one shown in FIG. 2 is used, water (functional water) containing chlorine is reserved in a bottom section of a processing tank, and air that is aerated in the water contains contaminating substances. In other words, when the aeration apparatus also functions as a gas mixing unit to mix the chlorine-containing air and the gas containing contaminating substances, the residual chlorine concentration may preferably be within the range specified above.

A chlorine solution having the characteristic properties described above may be prepared from reagents using hypochlorite or the like. For example, such a chlorine solution contains 0.001 to 0.1 mol/L of hydrochloric acid, 0.005 to 0.02 mol/L of sodium chloride and 0.0001 to 0.01 mol/L of sodium hypochlorite.

A chlorine solution with a pH value not higher than 4.0 and a chloride concentration not lower than 2 mg/L and not higher than 2000 mg/L may be prepared by using hydrochloric acid and hypochlorite. Such a chlorine solution contains 0.001 to 0.1 mol/L of hydrochloric acid and 0.0001 to 0.01 mol/L of sodium hypochlorite.

The aforementioned hydrochloric acid may be replaced by some other inorganic acid or by an organic acid. Inorganic acids that can be used in the embodiment of the invention include hydrofluoric acid, sulfuric acid, phosphoric acid and boric acid, whereas organic acids that can be used in the embodiment of the present invention include acetic acid, formic acid, malic acid, citric acid and oxalic acid. A commercially available weak acidic water generating powder (e.g., Kino-san 21X: trade name, a product of Clean Chemical) typically containing $N_3C_3O_3$ $NaCl_2$ may also be used for preparing a chlorine solution.

A chlorine solution having the characteristic properties similar to the above can be also prepared by dissolving electrolyte such as sodium chloride or potassium chloride into source water, and electrolyzing the water in a water tank having a pair of electrodes, i.e., anode and cathode. The chlorine solution can be obtained around the anode during electrolysis.

For example, the concentration of the electrolyte, for example, sodium chloride, in the source water before electrolysis may preferably be between 20 mg/L and 2000 mg/L, and more preferably between 200 mg/L and 1000 mg/L.

Undesired mixing of the acidic water produced around the anode and the alkaline water produced around the cathode can be prevented by providing a diaphragm between the paired electrodes. Such a diaphragm may suitably be, for example, an ion exchange membrane. To obtain such functional water, any commercially available strongly acidic electrolyzed water generator (e.g., OASYS Bio HALF: trade name, a product of Asahi Glass Engineering, or Strong Electrolyzed Water Generator Model FW-200: trade name, a product of Amano) may be used. The solution obtained is called electrolyzed water, electrolyzed functional water or functional water, which may be used for the sterilizing purpose.

So far, a chlorine-containing air generation unit, wherein water (functional water) containing chlorine is reserved in a bottom section of a processing tank, and air that is aerated in the water contains contaminating substances, shown in FIG. 2 has been described. In other words, an aeration apparatus that also functions as a gas mixing unit to mix the chlorine-containing air and the gas containing contaminating substances has been described.

As described below, chlorine may preferably be within a specified concentration range during decomposition in the decomposition reaction in the present invention. As long as the specified residual chlorine concentration is achieved during decomposition, the residual chlorine concentration in the water (functional water) containing chlorine in the chlorine-containing air generation unit may not necessarily be within the specified range.

Figure 3:
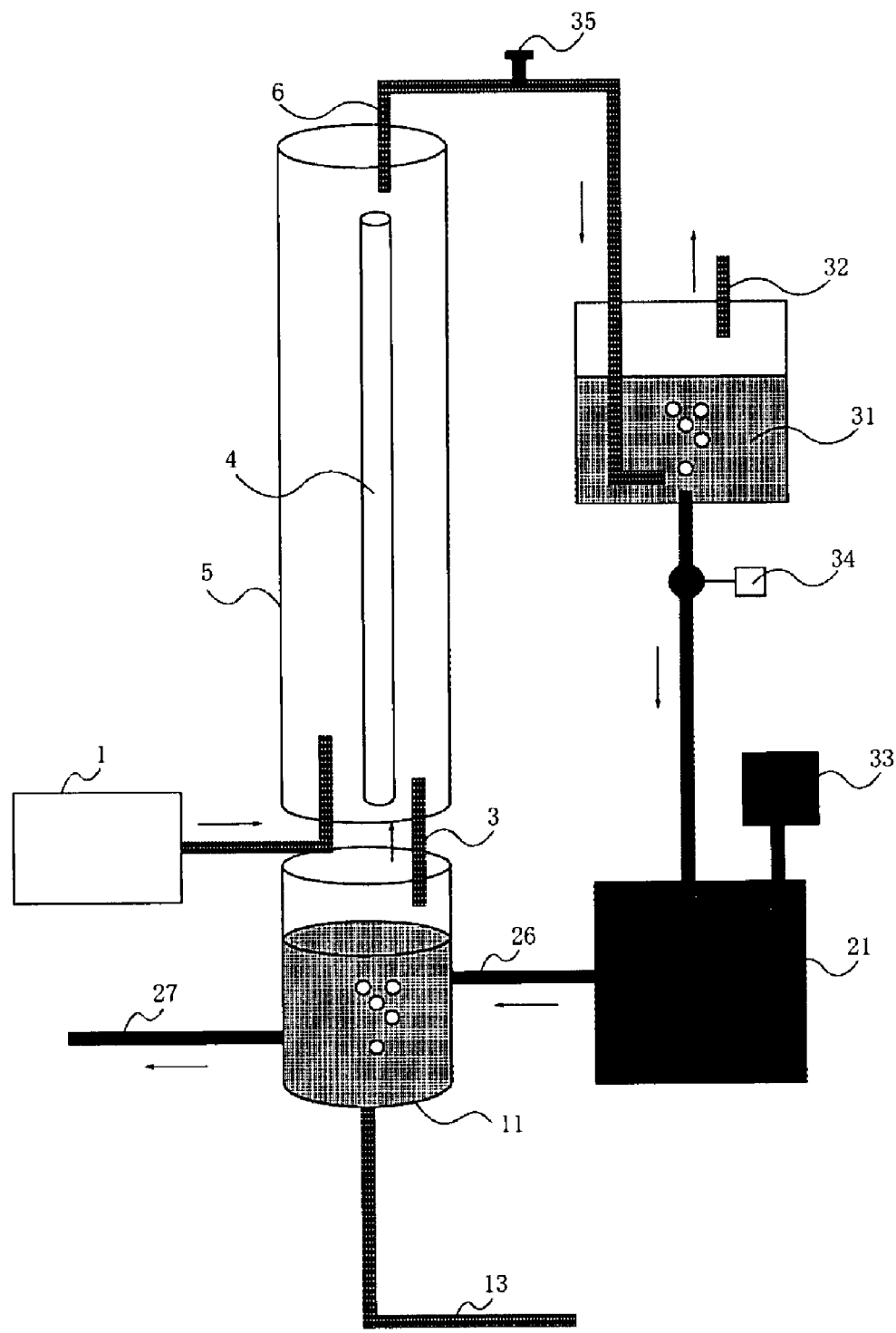
FIG. 3 is a schematic diagram of a decomposing apparatus for decomposing substances to be degraded in accordance with a second embodiment of the present invention.

For example, in a third embodiment shown in FIG. 3, gas that does not contain contaminating substances is introduced in water containing chlorine, and the produced chlorine gas is mixed with air containing contaminating substances. In this case, the residual chlorine concentration may preferably be higher than the range specified above.

More specifically, with the apparatus structure shown in FIG. 3, the produced chlorine gas is diluted by air containing contaminating substances. The dilution ratio is determined by ratios of the amount of produced chlorine gas to be supplied and the amount of air containing contaminating substances to be supplied to the reaction site. For example, the amount of air containing contaminating substances is four times the amount of produced chlorine gas, the chlorine concentration is reduced to ⅕. When the produced chlorine gas is diluted, the chlorine concentration needs to be maintained within the specified chlorine concentration range. Therefore, the residual chlorine concentration may preferably be higher than the range specified above in the case of the apparatus structure shown in FIG. 3.

Functional water (chlorine solution) containing a higher residual chlorine concentration may be more readily prepared by using reagents than by electrolysis. For example, functional water having a residual chlorine concentration 10 to 50 times greater than the functional water that is obtained by electrolysis can be obtained with the use of reagents. There may be the pros and cons as to whether or not a solution having such a high residual chlorine concentration can be called functional water. In the present invention, such a solution is also called functional water.

When functional water having such a high residual chlorine concentration is prepared by using reagents, such as, for example, hydrochloric acid and sodium hypochlorite, it may be better to combine sodium chloride and sodium hypochlorite in the chlorine generation tank rather than mixing them in advance prior to being introduced into the chlorine generation tank.

Source water as used herein for preparing a chlorine solution refers to tap water, river water or sea water. Such water typically shows a pH value between 6 and 8 and a chlorine concentration of less than 1 mg/L at most, and therefore is not capable of decomposing the organochlorine compounds mentioned above. In other words, functional water may be a solution containing chlorine that is able to generate chlorine gas as described below, and hence is not limited by the manufacturing methods for generating chlorine gas.

(3) Concentration of Chlorine Gas and Chlorine Gas Generating Unit

The chlorine solution, i.e., functional water described above is able to generate chlorine gas that is required entirely for decomposition. Air containing chlorine gas that is obtained by, for example, aerating air through functional water may be used as gas containing chlorine gas. This air may be mixed with a target gas to be degraded under light irradiation, such that the contaminating substances can be decomposed.

Instead of aerating air through functional water, air containing contaminating substances (i.e., polluted gas may be aerated through functional water to obtain a mixed gas of target gas to be degraded and chlorine gas.

When mixing the target gas to be degraded and the gas containing chlorine gas, the concentration of chlorine gas in the mixed gas may preferably be adjusted between 20 ppm by volume and 500 ppm by volume. Depending on the concentration of the target gas to be degraded, the efficiency in decomposing the target gas to be degraded is remarkably improved when the concentration of chlorine gas in the mixed gas is set between 20 ppm by volume and 500 ppm by volume.

(4) Unit for Aerating Functional Water

When gas containing contaminating substances and/or aerating gas is passed through functional water, a bubbler apparatus can be used. The bubbler apparatus may be any apparatus that can be used to blow air into liquid. However, the size of bubbles may preferably be selected to have a sufficient surface area to diffuse chlorine.

Also, the bubbler apparatus may preferably be formed from a material that is selected from materials that do not react with compositions of the functional water. For example, the bubbler apparatus may be formed with porous diffuser plates that are composed of sintered glass, porous ceramics, sintered SUS 316 and woven nets of fibrous sintered SUS 316, or spargers that are composed of pipes of glass or SUS 316.

(5) Main Reaction Site for Decomposition Process

In accordance with one embodiment of the present invention, air is passed through functional water, thereby generating air containing chlorine that is required for decomposition. The unit that passes air through functional water basically plays a role of a unit that supplies chlorine gas that is required for decomposition. The main reaction site where chlorine gas is supplied and the decomposition reaction takes place under light irradiation is a vapor phase section in the reaction vessel.

Accordingly, when generation of chlorine and decomposition reaction are integrated to take place in one vessel, the ratio of the vapor phase section and the liquid phase section in the vessel substantially affects the decomposition capacity. In other words, when the volume of functional water increases, the amount of chlorine that can be supplied increases, but this reduces the vapor phase section and reduces the area of decomposition reaction site. Conversely, when the vapor phase section increases, the area of the reaction site increases, and the decomposition reaction quickly progresses, but the area of the liquid phase section is reduced and thus the capacity to supply chlorine is reduced.

Also, depending on various factors, such as, the aeration rate, the rate of supplying functional water, when a region for generating air containing chlorine and a region for decomposition reaction (processing region) are integrated into a single unit, the ratio of liquid phase in the processing region may be set at 5 to 80%, and more preferably 10 to 20%. When they are not integrated, i.e., are provided independently from each other, the ratio between the volume of a vessel that generates air containing chlorine and the volume of a vessel for decomposition reaction may preferably be generally 1:1 to 1:9.

(6) Target Substances to be Decomposed

Contaminating substances to be degraded (hereinafter referred to as target substance) by a method according to the invention are, for example, organochlorine compounds such as chlorinated ethylene and chlorinated methane. Specific examples of chlorinated ethylene include 1-4-chlorine-substituted products of ethylene, such as chloroethylen, dichloroethylene (DCE), trichloroethylene (TCE) and tetrachloroethylene (PCE). Further, specific examples of dichloroethylene include 1,1-dichloroethylene (vinylidene chloride), cis-1,2-dichloroethylene and trans-1,2-dichloroethylene. Also, specific examples of chlorinated methane include chlorine-substituted products of methane such as chloromethane, dichloromethane and trichloromethane.

Target contaminating substances containing organochlorine compounds to be degraded by a method or apparatus of the present invention are not particularly limited. The method and apparatus of the present invention may be applied to purify sewage of dry cleaning factory, industrial exhaust gases, soils or underground water polluted with the contaminating substances described above. For example, the present invention is applicable to removal of contaminating substances that may be contained in gases produced at the time of air-stripping or gases vacuum-extracted from polluted soils.

(7) Light Irradiation Source

Irradiation light of the light irradiation source for decomposing target compounds, which is usable in the present invention, preferably has a wavelength between 300 and 500 nm, more preferably between 350 and 450 nm. In view of the intensity of irradiation to chlorine gas and target substances to be degraded, for example, light from a light source with a peak wavelength of about 365 nm and an intensity of several hundreds $\mu W/cm^2$ (as measured in a wavelength range between 300 nm and 400 nm) is sufficient for decomposing the target substances in practical applications.

In the present invention, ultraviolet light with a wavelength of 250 nm or shorter wavelengths, which are substantially harmful to human, are not required for the purpose of the invention, and therefore glass and plastic material can be used as a material for the reaction vessel.

Either natural light (e.g., sun light) or artificial light (from a mercury lamp, a black lamp, a color fluorescent lamp or a light emitting diode with a short wavelength (500 nm or less)) can be used for the purpose of the invention.

(8) Decomposition Reaction Mechanism

The present inventors have found that the decomposition of organochlorine compounds is promoted when they are irradiated with light in the presence of chlorine gas, although many aspects of its reaction mechanism are not clearly understood. However, it has been known that when chlorine is irradiated with light having a wavelength in a specific wavelength range, dissociation of chlorine takes place, and radials are generated. In the present invention also, it is believed that light irradiation induces generation of chlorine radicals, which reacts with target substances to be degraded, thereby severing their bonds.

Also, oxygen is indispensable for the reaction of the present invention. Such oxygen may be sufficiently supplied from oxygen radicals produced from decomposition of chlorine and water or oxygen that is normally present in the air.

[Unit to Trap Chlorine Alkaline Solution]

To completely decompose target substances to be degraded in a short time, an amount of chlorine that exceeds the amount of chlorine necessary for decomposition may preferably be supplied. However, by so doing, the purified gas that is discharged from the discharge or exhaust pipe 6 may contain chlorine. Such chlorine is collected and recovered by a chlorine trapping unit 31. The chlorine trapping unit 31 contacts an alkaline solution with the purified gas containing chlorine discharged from the exhaust pipe 6, such that chlorine is trapped by the alkaline solution, and purified air that does not contain any chlorine at all is discharged from a discharge or exhaust pipe 32.

Any contact unit may be used for contacting an alkaline solution with the discharged purified gas containing chlorine. For example, the purified gas containing chlorine may preferably be introduced in or aerated through an alkaline aqueous solution, which increases contacts between the gas and the liquid.

An alkaline aqueous solution for trapping chlorine can be obtained near a cathode when one or more electrolytes (e.g. sodium chloride and potassium chloride) described above are dissolved into the source water and the solution is subjected to electrolysis in a water tank provided with a pair of electrodes (cathode and anode). The alkaline aqueous solution may be called alkali ion water or the like that is believed to have effects on health and cosmetic improvements, and its generation apparatuses are commercially available.

A sodium hydroxide solution, calcium hydroxide solution or calcium carbonate solution can also be used as the alkaline aqueous solution for trapping chlorine. The concentration of such alkaline aqueous solution may be set according to the amount of chlorine that is to be collected, and may preferably be between 8 and 12 (pH value).

As the operation of the apparatus is continued, the pH value of the alkaline solution in the chlorine trapping unit 31 becomes lowered. The pH value may preferably be 8 or above but 12 or below, and an attention should be paid such that chlorine is not exhausted from the exhaust pipe 32.

As the operation of the apparatus is continued for some time, the residual chlorine concentration of the alkaline solution in the chlorine trapping unit 31 becomes increased. When the residual chlorine concentration reaches a specified concentration level, for example, 5 to 1000 mg/L, and more preferably 30 to 120 mg/L, the solution is sent to the chlorine solution tank 21, and can be used again for generating air containing chlorine.

In this instance, the pH value of the alkaline solution needs to be adjusted in the chlorine solution tank 21. The pH value can be adjusted by adding to the alkaline solution an acid that is supplied from an acid supplying unit 38. The pH value may preferably be adjusted between 1 and 4, and more preferably between 2 and 3. An acidic solution to be used for pH adjustment may use at least one kind of acid selected from inorganic acids or organic acids, such as, for example, hydrochloric acid, hydrofluoric acid, oxalic acid, sulfuric acid, phosphoric acid, boric acid, acetic acid, formic acid, malic acid and citric acid.

As a result, the chlorine solution whose pH value is adjusted in the chlorine solution tank 21. i.e., functional water (II), can be used again for generating chlorine gas that is used for decomposition.

The processes described above can be repeated to realize a decomposition and purification process effectively utilizing chlorine.

The chlorine trapping unit may be operated in a variety of ways by any appropriate operation systems including a system based on a batch-wise system such as the one described above, a continuous operation system to be described below, or a system combining a batch-wise system and a continuous operation system.

Figure 6:
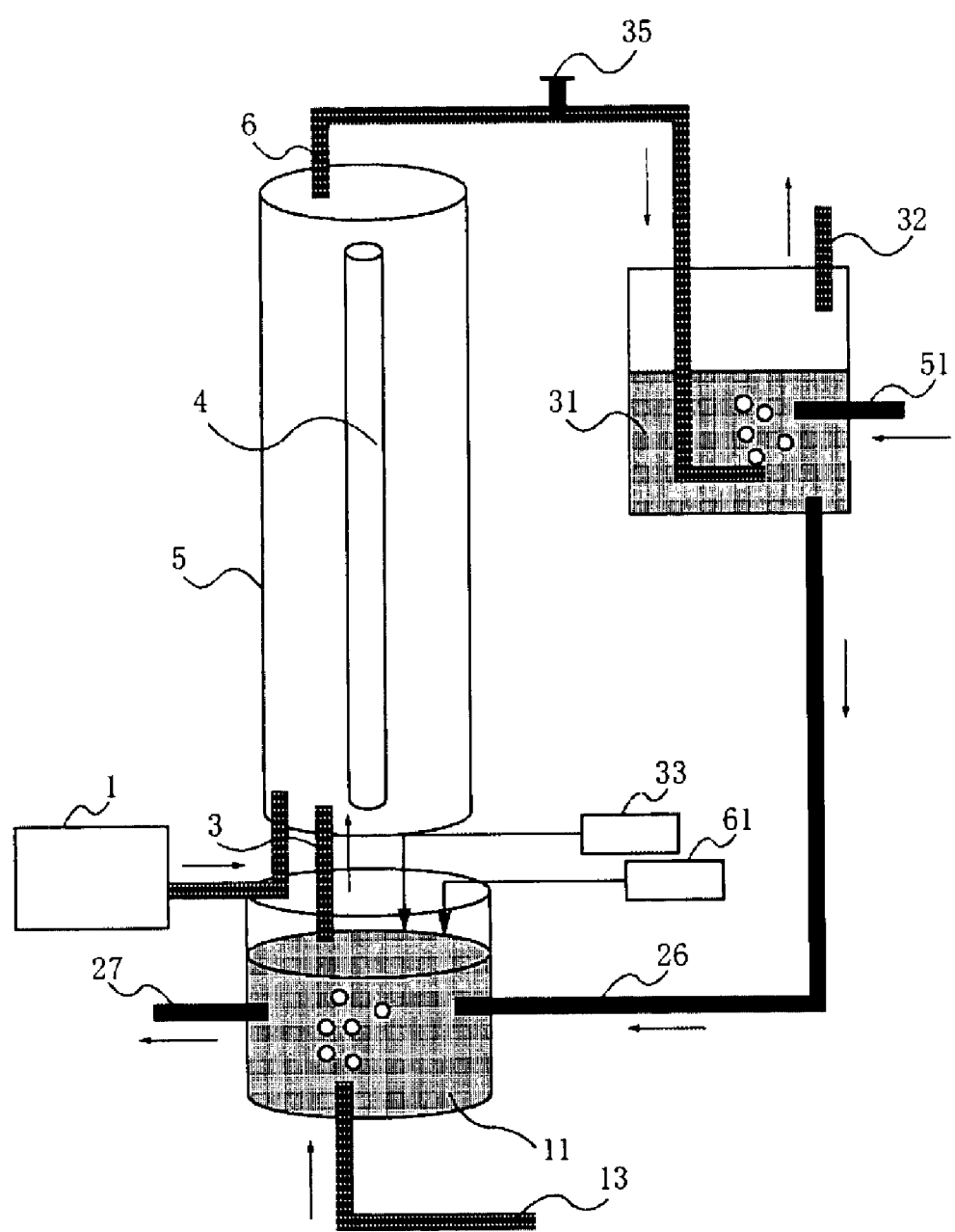
FIG. 6 is a schematic diagram of a decomposing apparatus for decomposing substances to be degraded in accordance with a fifth embodiment of the present invention.

FIG. 6 is a schematic diagram of a system that continuously sends chlorine trapped and collected to a chlorine gas generation vessel 11. More specifically, the water containing alkaline chlorine is continuously supplied as water containing collected chlorine from a chlorine trapping unit 31 to the chlorine gas generation vessel 11 through a pipe 26.

By supplying the alkaline solution at a constant rate into the chlorine trapping unit 31 through an alkaline water supply pipe 51, a stabilized state is attained after a predetermine period of time in which the alkaline solution containing chlorine with a generally constant concentration can be carried in the pipe 26.

Also, the chlorine concentration of the solution to be supplied to the chlorine gas generation vessel 11 can be controlled based on the volume of the alkaline solution to be supplied and the volume of gas containing chloride after decomposition. The chlorine concentration of the solution to be supplied is proportional to values obtained by dividing the amount of trapped chlorine per unit time in the alkaline solution by the amount of alkaline solution to be supplied per unit time. For example, when the amount of trapped chlorine per unit time is constant, the fewer the amount of alkaline solution to be supplied, the fewer the chlorine containing solution with a high concentration can be sent to the chlorine gas generation vessel 11.

In this manner, the residual chlorine concentration of the alkaline solution from the chlorine gas generation vessel 11 can be increased to, for example, about 20000 mg/L. Preferably, the residual chlorine concentration of the alkaline solution may be between 1000 and 10000 mg/L. The higher the concentration, the fewer the amount of the solution to be supplied, and the fewer the total drainage amount. The concentrated solution shows characteristic properties similar to those of hypochlorite solution. This concentrated solution can be sent to the chlorine gas generation vessel 11 and can be used again to generate air containing chlorine.

In other words, the solution containing chlorine that is collected by the trapping unit is continuously sent to the chlorine gas generation vessel 11; a shortage of chlorine may be supplemented from a supply unit 61 when necessary; and the pH value of the solution may be adjusted using the acid supplying unit 33 for supplying acidic solution. As a result, functional water (II) is generated within the chlorine gas generation vessel 11. The solution is aerated to generate gas containing chloride that is used for decomposition.

EXAMPLES

Now, the present invention will be described on the basis of each embodiment illustrated in the drawings.

Embodiment Example 1

The present invention is experimentally confirmed using a system indicated in FIG. 2.

A glass column having a volume of 400 mL was used as the reaction apparatus 5. 150 mL of chlorine solution (functional water (I)) is placed in a bottom section of the reaction apparatus 5. Also, another 150 mL of similar chlorine solution (functional water (I)) is stored in the chlorine solution tank 21, and the chlorine solution is supplied at a rate of 2 mL/min from the chlorine solution tank 21 to the reaction apparatus 5, and the chlorine solution is discharged from the discharge pipe 27 at a rate of 2 mL/min.

The chlorine solution (functional water (I)) was prepared with hydrochloric acid and sodium hypochlorite. More specifically, 0.125 mL of 12% of sodium hypochlorite solution (containing about 12% at the time of manufacturing, effective chlorine: min 5%, a product of Kishida Chemical) was added to 100 mL of source water, and 0.63 mL of hydrochloric acid (35% hydrochloric acid) was added to 100 mL of source water. As a result, the chlorine solution (functional water (I)) had pH 2.5 and residual chlorine concentration of 110 mg/L.

Then, the generated gas was irradiated with light by the light irradiation unit 4, a black light fluorescent lamp. (20 W, trade name: FL:20S, BLB, a product of Toshiba), during which the intensity of irradiation was 0.4 to 1.2 mW/cm$^2$. Although, the figure shows that the light irradiation unit 4 is located inside the reaction apparatus, the light was irradiated from outside the glass column toward the inside the reaction apparatus in the experiment.

Simultaneously with the irradiation of light, air similar to polluted air vacuum-aspirated from contaminated soils, which was produced by using a permeator (a product of Gastec), containing TCE at a concentration of 80 ppm by volume and PCE at a concentration of 20 ppm by volume were blown into the chlorine solution in the bottom section of the reaction vessel 5 at a rate of 200 mL/min.

For 30 minutes after the operation of the apparatus was started, concentrations of TCE and PCE in the exhausted air from the reaction apparatus were periodically sampled at a sampling port 35 by using a gas-tight syringe, and the concentrations of TCE and PCE were measured by gas chromatography (GC-14B: trade name, a product of Shimadzu Seisakusho with an FID detector; DB-624 column: trade name, a product of J&W Inc.), but none of them was detected. Also, after the operation is stopped, TCE and PCE concentrations in the discharged chlorine solution were measured, but none of them was detected. As a result, it was shown that TCE and PCE could be decomposed.

The gas that was discharged from the exhaust pipe 6 was injected into 120 mL of alkaline solution containing sodium hydroxide having a pH value of 11.2 within the chlorine trapping unit 31. Chlorine concentration was measured at the exhaust pipe 32 several times by a detector tube (No. 8H: trade name, a product of Gastec), and found to be 0.5 ppm by volume or less in any of the measurements.

The above state was maintained and, when the operation of the apparatus was continued for 60 minutes, the pH value and the chlorine concentration of the alkaline solution in the chlorine trapping unit 31 were measured. The measured pH value was 9.8 and the residual chlorine concentration was 107 mg/L. Then, the gas supply from the permeator was stopped, the valve 34 was opened to send the alkaline solution containing chlorine from the chlorine trapping unit 31 to the chlorine solution tank 21, and by using the acid supplying unit 33, 0.06 mL of hydrochloric acid (35%) was added in the chlorine solution. As a result, the pH value was 2.9 and the residual chlorine concentration was 105 mg/L. Also, similar alkaline solution was newly added to the chlorine trapping unit 31.

The gas supply from the permeator was started again, and decomposition reaction was performed again by using the chlorine solution (functional water (II)) generated from chlorine recovered from the chlorine trapping unit. It was confirmed that a decomposing capability similar to that of the previous solution was maintained.

Even when the above described process was repeated, the decomposing capability was not lowered. Also, it was confirmed that chlorine solution (functional water (II)) capable of generating air containing chlorine that is necessary for decomposition can be produced repeatedly by adjusting the pH value when the chlorine, which is contained in gases after the reaction and collected with alkaline solution, reaches a specified chlorine concentration. Furthermore, it was confirmed that, by using chlorine generated from the solution (functional water (II)), the decomposition can be continuously progressed.

Embodiment Example 2

In the first embodiment example, water containing chlorine (i.e., chlorine solution, functional water) is aerated with a target gas to be degraded. However, in this embodiment example, the supply of a target gas to be degraded and the aeration for water containing chlorine (i.e., chlorine solution, functional water) are independently conducted.

Referring to FIG. 3, a reaction apparatus 5 is a vessel that mixes and contains air containing chlorine supplied from a chlorine gas generation vessel 11 and gaseous organochlorine compounds to be degraded, and the interior of the reaction apparatus 5 is irradiated with light. The gaseous organochlorine compounds to be degraded is supplied to the interior of the reaction apparatus 5 from a target substance supply unit 1 that supplies target substances to be degraded.

Water containing chlorine (i.e., chlorine solution, functional water) is continuously supplied to the chlorine gas generation vessel 11 through a pipe 26 and discharged through a pipe 27, at a optional flow rate. Chlorine-containing water (functional water (I)) is prepared at a chlorine solution tank 21. Gases used for aeration are continuously supplied at a optional flow rate to the chlorine gas generation vessel 11 through a supply pipe 13. As a result, gas containing chlorine gas is discharged from a discharge pipe 3.

The gas containing chlorine gas is introduced into the reaction vessel 5, and mixed with the target substrate to be degraded. The mixed gas is irradiated with light by a light irradiation unit 4 inside the reaction apparatus 5, such that the target compounds to be degraded are decomposed.

To completely decompose the target substances to be degraded, an amount of chlorine that exceeds the amount of chlorine necessary for decomposition may preferably be supplied. However, by so doing, the purified gas that is discharged from the discharge pipe 6 may contain chlorine. Such chlorine is collected and recovered by a chlorine trapping unit 31. The chlorine trapping unit 31 contacts an alkaline solution with the purified gas containing chlorine discharged from the exhaust pipe 6, such that chlorine is trapped by the alkaline solution, and purified air that does not contain any chlorine at all is discharged from a discharge pipe 32.

As the operation of the apparatus is continued for some time, the residual chlorine concentration of the alkaline solution in the chlorine trapping unit 31 becomes increased. When the residual chlorine concentration reaches a specified concentration level, preferably, 30 to 120 mg/L, the solution was sent to the chlorine solution tank 21, and could be used again for generating air containing chlorine.

In this instance, the pH value of the alkaline solution needs to be adjusted in the chlorine solution tank 21. The pH value of the alkaline solution can be adjusted by adding acid from an acid supplying unit 33 to the alkaline solution. The pH value may preferably be adjusted between 1 and 4, and more preferably between 2 and 3. As a result, the chlorine solution whose pH value is adjusted in the chlorine solution tank 21 (i.e., functional water (II)) can be used again for generating chlorine gas that is used for decomposition.

The second embodiment example of the present invention is experimentally confirmed using a system indicated in FIG. 3.

A glass column having a volume of 400 mL was used as the reaction apparatus 5. 150 mL of chlorine solution (functional water (I)) is placed in a glass bottle as the chlorine gas generation vessel 11. Also, another 150 mL of similar chlorine solution (functional water (I)) is stored in the chlorine solution tank 21, and the chlorine solution is supplied at a rate of 2 mL/min from the chlorine solution tank 21 to the chlorine gas generation vessel 11, and the chlorine solution is discharged from the discharge pipe 27 at a rate of 2 mL/min.

The chlorine solution (functional water (I)) was prepared with hydrochloric acid and sodium hypochlorite. More specifically, 0.125 mL of 12% of sodium hypochlorite solution (containing about 12% at the time of manufacturing, effective chlorine: min 5%, a product of Kishida Chemical) was added to 100 mL of source water, and 0.6 mL of hydrochloric acid (35% hydrochloric acid) was added to 100 mL of source water. As a result, the chlorine solution (functional water (I)) had pH 2.5 and residual chlorine concentration of 95 mg/L.

Then, the generated gas was irradiated with light from the light irradiation unit 4, a black light fluorescent lamp (20 W, trade name: FL:20S, BLB, a product of Toshiba), during which the intensity of irradiation was 0.4 to 0.7 mW/cm$^2$. Although, the figure shows that the light irradiation unit 4 is located inside the reaction apparatus, the light was irradiated from outside the glass column toward in the inside the reaction apparatus in the experiment.

Simultaneously with the irradiation of light, polluted air, which was produced by using a permeator (a product of Gastec), containing TCE at a concentration of 160 ppm by volume and dichloromethane at a concentration of 40 ppm by volume were blown into the chlorine solution in the bottom section of the reaction apparatus at a rate of 100 mL/min. Also, air is blown in the chlorine gas generation vessel 11 at a flow rate of 100 mL/min.

For 30 minutes after the operation of the apparatus was started, concentrations of TCE and dichloromethane in the exhausted air from the reaction apparatus were periodically sampled at a sampling port 35 by using a gas-tight syringe, and the concentrations of TCE and dichloromethane wars measured by gas chromatography (GC-14B: trade name, a product of Shimadzu Saisakusho with an FID detector; DB-624 column: trade name, a product of J&W Inc.), but none of them was detected. Also, after the operation is stopped, concentrations of TCE and dichlorormethane in the discharged chlorine solution were measured, but none of them was detected. As a result, it was shown that TCE and dichloromethane could be decomposed.

The gas that was discharged from the exhaust pipe 6 was injected into 120 mL of alkaline solution containing sodium hydroxide having pH 11.2 within the chlorine trapping unit 31. Chlorine concentration was measured at the exhaust pipe 32 several times by a detector tube (No. 8H: trade name, a product of Gastec), and found to be 0.5 ppm by volume or less in any of the measurements.

The above state was maintained and, when the operation of the apparatus was continued for 60 minutes, the pH value and the chlorine concentration of the alkaline solution in the chlorine trapping unit 31 were measured. The measured pH value was 9.5 and the residual chlorine concentration wan 94 mg/L. Then, the gas supply from the permeator was stopped, the valve 34 was opened to send the alkaline solution containing chlorine from the chlorine trapping unit 31 to the chlorine solution tank 21, and by using the acid supplying unit 33, 0.06 mL of hydrochloric acid (35%) was added in the chlorine solution. As a result, the pH value was 2.9 and the residual chlorine concentration was 93 mg/L. Source water was added to the chlorine solution in the tank 21 to make the residual chlorine concentration of the chlorine solution to be 70 mg/L, and several drops of hydrochloric acid were added to the chlorine solution in the tank 21 so that the pH value of the chlorine solution to be 2.3. Also, similar alkaline solution was newly added to the chlorine trapping unit 31.

The gas supply from the permeator was started again, and decomposition reaction was performed again by using the chlorine solution (functional water (II)) generated from chlorine recovered from the chlorine trapping unit. It was confirmed that a decomposing capability similar to that of the previous solution was maintained.

Even when the above described process was repeated, the decomposing capability was not lowered. Also, it was confirmed that chlorine solution (functional water (II)) capable of generating air containing chlorine that is necessary for decomposition can be produced repeatedly by adjusting the pH value when the chlorine, which is contained in gases after the reaction and collected with alkaline solution, reaches a specified chlorine concentration. Furthermore, it was confirmed that, by using chlorine generated from the solution (functional water (II)), the decomposition can be continuously progressed.

Embodiment Example 3

Figure 4:
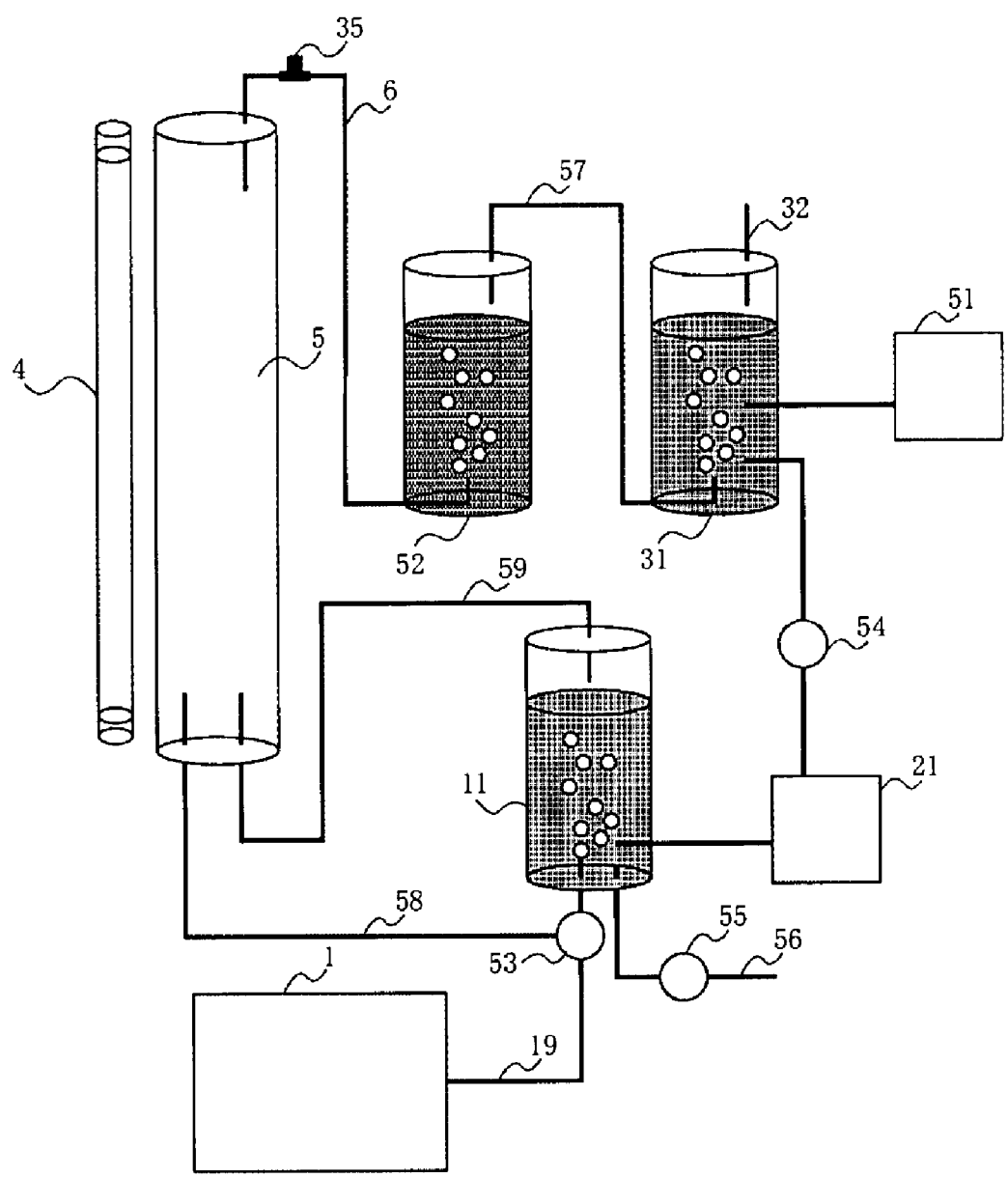
FIG. 4 is a schematic diagram of a decomposing apparatus for decomposing substances to be degraded in accordance with a third embodiment of the present invention.

FIG. 4 schematically shows a third embodiment example having a basic structure that uses the apparatus of the second embodiment example, which is additionally provided with a trapping apparatus using an acidic solution.

Referring to FIG. 4, a reaction apparatus 5 is a vessel that mixes air containing chlorine supplied from a chlorine gas generation vessel 11 and gaseous organochlorine compounds to be degraded, and the interior of the reaction apparatus 5 is irradiated with light. The gaseous organochlorine compounds to be degraded is supplied to the interior of the reaction apparatus 5 through a pipe 19 from a target substance supply unit 1 that supplies target substance to be degraded. The gaseous organochlorine compounds to be degraded passing through the pipe 19 is appropriately distributed by a valve 53 to the chlorine gas generation vessel 11 and a pipe 58, and is eventually supplied to the reaction apparatus 5. Chlorine-containing gas and the target substance to be degraded introduced into the reaction apparatus 5 are mixed, and then irradiated with light by a light irradiation unit 4 inside the reaction apparatus 5 such that the target compounds to be degraded are decomposed.

Water containing chlorine (i.e., chlorine solution, functional water) is supplied to the chlorine gas generation vessel 11 from a chlorine solution tank 21. The chlorine gas generation vessel 11 is connected to a discharge pipe 56.

To completely decompose the target substances to be degraded, an amount of chlorine that exceeds the amount of chlorine necessary for decomposition may preferably be supplied. However, by so doing, the purified gas that is discharged from the discharge pipe 6 may contain chlorine. Such chlorine is collected and recovered by a chlorine trapping unit 31. The chlorine trapping unit 31 contacts an alkaline solution with the purified gas containing chlorine discharged from the exhaust pipe 6, such that chlorine is trapped by the alkaline solution, and purified air that does not contain any chlorine at all is discharged from a discharge pipe 32.

However, the purified gas containing chlorine that is discharged from the discharge pipe 6 may contain acidic substance since decomposition products are mainly acidic substance. There may be cases where the acidic substance may flow together with the purified gas and discharged. In such cases, when chlorine is trapped the alkaline solution, the acidic substance is also trapped in the alkaline solution, and the hydrogen ion concentration (pH value) of the alkaline solution gradually lowers, and the alkaline solution eventually becomes to be an acidic solution, and loose its ability to trap chlorine.

To prevent such an incident, an acidic substance trapping unit 52 to trap acid is provided in the upstream of the chlorine trapping unit 31. In the acidic substance trapping unit 52, an acidic solution contacts the purified gas containing chlorine discharged from the discharge pipe 6, and collects aqueous acidic substance. At this time, almost the entire chlorine contained in the purified gas is not trapped by the acidic solution, and sent to the chlorine trapping unit 31 through the pipe 57 and collected at the chlorine trapping unit 31.

For example, when the polluted substance is trichloroethylene, the purified gas containing chlorine discharged from the discharge pipe 6 contains dichloroacetic acid. The dichloroacetic acid is produced by dichloroacetylchloride, which is a decomposition product of trichloroethylene, reacting with water molecules in the air. Dichloroacetic acid is in many cases liquid under normal temperature and normal pressure, and may be discharged in a mist state together with the flow of the purified gas. The purified gas containing dichloroacetic acid is collected in the aqueous solution in the acidic substance trapping unit 52, which is a first trap. When the aqueous solution is acid, the amount of chlorine that can be dissolved and present in the aqueous solution is small, and almost the entire chlorine contained in the purified gas is not trapped by the acidic solution of the first trap, but is sent through the pipe 57 and trapped and collected by the chlorine trapping unit 31, which is a second trap.

The structure having the first and second traps described above is not limited by methods, apparatuses or structures for generating chlorine. In other words, the structure having the first and second traps can be used as a post processing apparatus after the polluted substance decomposition/purification apparatus and method in which a target gas to be processed containing chlorine and polluting substances in air is irradiated with light by a light irradiation unit to decompose the polluting substances. Also, the use of collected chlorine is not essential, and the structure having the first and second traps may be applied to a structure in which collected chlorine is discharged without being recovered. Furthermore, since the structure having the first and second traps is applicable to structures in which the use of collected chlorine is not essential, the structure having the first and second traps can also be applied to structures using photolysis which do not require chlorine as an essential substance.

The acidic substance trapping unit 52 may use any solution as long as such solution can trap acidic substances.

For example, the solution may preferably have a hydrogen ion concentration (pH value) of 4 or lower, and more preferably be between 1 and 3. Such a solution may use at least one kind of acid that may be selected from inorganic acids or organic acids, such as, for example, hydrochloric acid, hydrofluoric acid, oxalic acid, sulfuric acid, phosphoric acid, boric acid, acetic acid, formic acid, malic acid and citric acid.

However, in accordance with an embodiment example 4 (to be described in greater detail below), a configuration that uses an alkaline solution can also serve the purpose of trapping acidic substances. In this case, a constant amount of chlorine is trapped in an alkaline solution for a certain period of time. As the pH value of the alkaline solution lowers with an increase of the acidic substances trapped, the chlorine is released again from the alkaline solution. In other words, a solution for trapping acidic substances can be initially started with an alkaline solution. However, as the operation of the apparatus is continued, the pH value of such a solution for trapping acidic substances becomes to be within the aforementioned rage of hydrogen ion concentrations (pH values).

As the operation of the apparatus is continued for some time, the residual chlorine concentration of the alkaline solution in the chlorine trapping unit 31 becomes increased. When the residual chlorine concentration reaches a specified concentration level, preferably, 30 to 120 mg/L, the solution is sent to the chlorine solution tank 21, and can be used again for generating air containing chlorine.

In this instance, the pH value of the alkaline solution needs to be adjusted in the chlorine solution tank 21. The pH value may preferably be adjusted between 1 and 4, and more preferably between 2 and 3. As a result, the chlorine solution whose pH value is adjusted in the chlorine solution tank 21 (i.e., functional water (II)) can be used again for generating chlorine gas that is used for decomposition.

The third embodiment example of the present invention is experimentally confirmed using a system indicated in FIG. 4.

A glass column having a volume of 400 mL was used as the reaction apparatus 5. 150 mL of chlorine solution (functional water (I)) is placed in a glass bottle as the chlorine gas generation vessel 11. Also, another 150 mL of similar chlorine solution (functional water (I)) is stored in the chlorine solution tank 21, and the chlorine solution is supplied at a rate of 2 mL/min from the chlorine solution tank 21 to the chlorine gas generation vessel 11, and the chlorine solution is discharged from the discharge pipe 56 at a rate of 2 mL/min.

The chlorine solution (functional water (I)) was prepared with hydrochloric acid and sodium hypochlorite. More specifically, 0.125 mL of 12% of sodium hypochlorite solution (containing about 12% at the time of manufacturing, effective chlorine: min 5%, a product of Kishida Chemical) was added to 100 mL of source water, and 0.63 mL of hydrochloric acid (35% hydrochloric acid) was added to 100 mL of source water. As a result, the chlorine solution (functional water (I)) had pH 2.5 and residual chlorine concentration of 105 mg/L.

Then, the generated gas was irradiated with light from the light irradiation unit 4, a black light fluorescent lamp (20 W, trade name: FL:20S, BLB, a product of Toshiba), during which the intensity of irradiation was 0.4 to 1.2 mW/cm$^2$.

Simultaneously with the irradiation of light, air containing TCE at a concentration of 250 ppm by volume, which was produced by using a permeator (a product of Gastec), was blown into the bottom section of the reaction apparatus 5 at a flow rate of 100 mL/min. Also, air is blown in the chlorine gas generation vessel 11 at a flow rate of 100 mL/min.

For 30 minutes after the operation of the apparatus was started, concentrations of TCE in the exhausted air from the reaction apparatus were periodically sampled at a sampling port 35, and the concentration of TCE was measured by gas chromatography (GC-14B: trade name, a product of Shimadzu Seisakusho with an FID detector; DB-624 column: trade name, a product of J&W Inc.), but no TCE was detected. Also, after the operation is stopped, the concentration of TCE in the discharged chlorine solution was measured, but no TCE was detected. As a result, it was shown that TCE could be completed decomposed.

The gas that was discharged from the exhaust pipe 6 was injected into 100 mL of hydrochloric acidic solution having pH 3.2 within the acidic substance trapping unit 52. The purified gas that has passed the acidic solution was sent through the pipe 57 to the chlorine trapping unit 31 and injected into 120 mL of alkaline solution containing sodium hydroxide having pH 11.2 within the chlorine trapping unit 31. The chlorine concentration was measured at the exhaust pipe 32 several times by a detector tube (No. 8H: trade name, a product of Gastec), and found to be 0.5 ppm by volume or less in any of the measurements.

The above state was maintained and, when the operation of the apparatus was continued for 180 minutes, the pH value and the chlorine concentration of the acidic solution in the acidic substance trapping unit 52 and of the alkaline solution in the chlorine trapping unit 31 were measured. The acidic solution in the acidic substance trapping unit 52 had a pH value of 1.2 and a residual chlorine concentration of 32 mg/L, and the alkaline solution in the chlorine trapping unit 31 had a pH value of 11.0 and a residual chlorine concentration of 217 mg/L. Then, the gas supply from the permeator was stopped, the valve 54 was opened to send the alkaline solution containing chlorine from the chlorine trapping unit 31 to the chlorine solution tank 21, and 0.06 mL of hydrochloric acid (35%) was added in the chlorine solution, which, as a result, made the pH value to be 2.9 and the residual chlorine concentration 188 mg/L. Source water was added to the chlorine solution in the tank 21 to make the residual chlorine concentration of the chlorine solution to be 70 mg/L, and several drops of hydrochloric acid were added to the chlorine solution in the tank 21 so that the pH value of the chlorine solution to be 2.3. Also, similar alkaline solution was newly added to the chlorine trapping unit 31.

The gas supply from the permeator was started again, and decomposition reaction was performed again by using the chlorine solution (functional water (II)) generated from chlorine recovered from the chlorine trapping unit. It was confirmed that a decomposing capability similar to that of the previous solution was maintained.

Even when the above described process was repeated, the decomposing capability was not lowered. Also, it was confirmed that chlorine solution (functional water (II)) capable of generating air containing chlorine that is necessary for decomposition can be produced repeatedly by adjusting the pH value when the concentration of chlorine, which is contained in gases after the reaction and collected with alkaline solution, reaches a specified concentration. Furthermore, it was confirmed that, by using chlorine generated from the solution (functional water (II)), the decomposition can be continuously progressed.

Embodiment Example 4

Decomposition experiments were conducted with an apparatus similar to the third embodiment example, and an alkaline solution placed in the acidic substance trapping unit 52 instead of an acidic solution.

The concentration of TCE measured at the sampling port 35, and the chlorine concentration measured at the exhaust pipe 32 were about the same values measured in the third embodiment example, and purification of the polluting substances and recovery of chlorine were favorably conducted.

When the decomposition operation was continuously conducted for 180 minutes, the pH value and the chlorine concentration of the alkaline solution in the acidic substance trapping unit 52 and of the alkaline solution in the chlorine trapping unit 31 were measured. The alkaline solution in the acidic substance trapping unit 52 had a pH value of 3.0 and a residual chlorine concentration of 20 mg/L, and the alkaline solution in the chlorine trapping unit 31 had a pH value of 10.2 and a residual chlorine concentration of 185 mg/L.

From the results of the third and fourth embodiment examples, it becomes clear that an acidic solution has an extremely low chlorine trapping capability, and when a polluted gas with a high concentration of contaminants is continuously processed for a long time, the provision of an acidic substance trip in an upstream of a chlorine trap is effective in suppressing pH changes in the chlorine trap and thoroughly trapping chlorine.

Embodiment Example 5

In the embodiment examples 1 and 2, water containing chlorine (functional water) is aerated to generate gas containing chlorine. However, in accordance with a fifth embodiment example, small liquid droplets of water containing chlorine (functional water) are formed to thereby promote generation of gas containing chlorine and improve a gas-liquid contact efficiency for conducting decomposition reaction.

Figure 5:
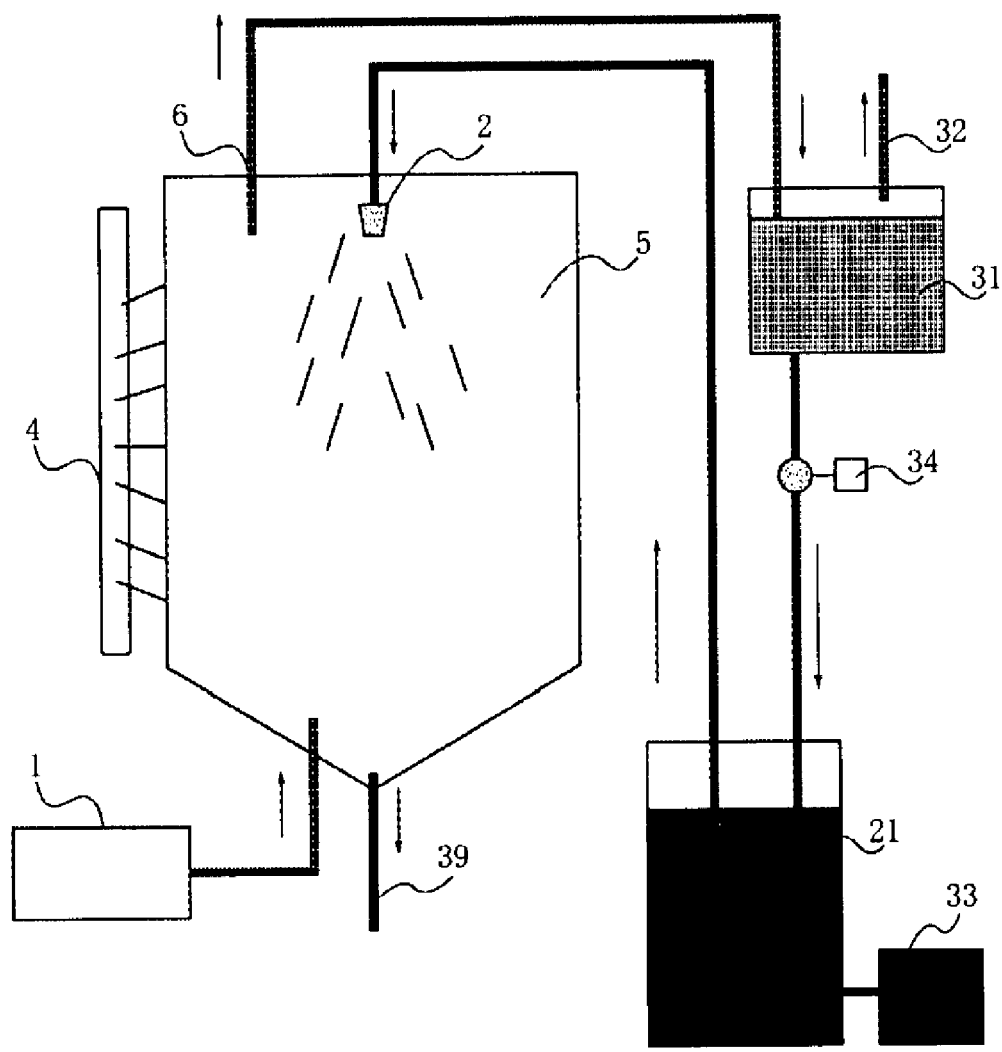
FIG. 5 is a schematic diagram of a decomposing apparatus for decomposing substances to be degraded in accordance with a fourth embodiment of the present invention.

More specifically, referring to FIG. 5, a nozzle 2 is provided at an upper section of a reaction apparatus 5. The nozzle 2 forms and ejects small liquid droplets of water containing chlorine (functional water). A supply control unit (tank) 21 is connected to the nozzle 2 at the reaction apparatus 5. The supply control unit 21 controls a continuous supply of chlorine solution (functional water) to the reaction apparatus 5 at an optional flow rate. A target substance to be degraded that is supplied from a target substance supply unit 1 is charged from a bottom section of the reaction apparatus 5. Inside the reaction apparatus 5, air containing chlorine that is generated from the chlorine solution (functional water) and gaseous organochlorine compounds are mixed. Also, the chlorine solution (functional water) contacts the gaseous organochlorine compounds. The interior of the reaction apparatus 5 is irradiated with light by a light irradiation unit 4.

To completely decompose the target substances to be degraded, an excessive amount of chlorine that exceeds the amount of chlorine necessary for decomposition may preferably be supplied, However, by so doing, the purified gas that is discharged from the discharge pipe 6 may contain chlorine. Such chlorine is collected and recovered by a chlorine trapping unit 31. The chlorine trapping unit 31 contacts an alkaline solution with the purified gas containing chlorine discharged from the exhaust pipe 6, such that chlorine is trapped by the alkaline solution, and purified air that does not contain any chlorine at all is discharged from a discharge pipe 32.

As the operation of the apparatus is continued for some time, the residual chlorine concentration of the alkaline solution in the chlorine trapping unit 31 becomes increased. When the residual chlorine concentration reaches a specified concentration level, preferably, 30 to 120 mg/L, the solution was sent to the chlorine solution tank 21, and could be used again for generating air containing chlorine.

In this instance, the pH value of the alkaline solution needs to be adjusted in the chlorine solution tank 21. The pH value of the alkaline solution can be adjusted by adding acid from an acid supplying unit 33 to the alkaline solution. The pH value may preferably be adjusted between 1 and 4, and more preferably between 2 and 3. As a result, the chlorine solution whose pH value is adjusted in the chlorine solution tank 21 (i.e., functional water (II)) can be ejected by the nozzle 2 into small liquid droplets and used again for generating chlorine gas that is used for decomposition.

Embodiment Example 6

In accordance with a sixth embodiment example, a chlorine solution that is recovered by a trap is continuously supplied to generate chlorine gas necessary for decomposition.

Referring to FIG. 6, a reaction apparatus 5 is a vessel that mixes and contains air containing chlorine and gaseous organochlorine compounds to be degraded supplied from a chlorine gas generation vessel 11, and the interior of the reaction apparatus 5 is irradiated with light. The gaseous organochlorine compounds to be degraded is supplied to the interior of the reaction apparatus 5 from a target substance supply unit 1 that supplies target substances to be degraded.

Water containing chlorine is continuously supplied to the chlorine gas generation vessel 11 through a pipe 26 and discharged through a pipe 27, at an optional flow rate. The chlorine-containing water is continuously supplied from a chlorine trapping unit 31 through a pipe 26 as recovered chlorine-containing water.

More specifically, within the chlorine gas generation vessel 11, an alkaline solution containing chlorine and a solution containing acid from an acid supplying unit 33 are mixed. Furthermore, a gas is blown in the chlorine gas generation vessel 11 through a supply pipe 13 at an optional flow rate. As a result, a gas containing chlorine gas is discharged from a discharge pipe 3. The gas containing chlorine gas is introduced into the reaction apparatus 5, and mixed with the target substance to be degraded. Then, the mixed gas is irradiated with light by a light irradiation unit 4 inside the reaction apparatus 6, such that the target compounds to be degraded are decomposed.

To completely decompose or accelerate decomposition of target substances to be degraded, an excessive amount of chlorine that exceeds the amount of chlorine necessary for decomposition may preferably be supplied. However, by so doing, the purified gas that is discharged from the discharge pipe 6 may contain chlorine. Such chlorine is collected and recovered by a chlorine trapping unit 31. The chlorine trapping unit 31 contacts an alkaline solution with the purified gas Containing chlorine discharged from the exhaust pipe 6, such that chlorine is trapped by the alkaline solution, and purified air that does not contain any chlorine at all is discharged from a discharge pipe 32.

In this instance, when an alkaline solution is supplied to the chlorine trapping unit 31 through an alkaline solution supply unit 51 at a constant rate, a stabilized state is attained after a predetermine period of time in which the alkaline solution containing chlorine with a generally constant concentration can be carried in the pipe 26.

Also, the chlorine concentration of the solution to be supplied to the chlorine gas generation vessel 11 can be controlled based on the volume of the alkaline solution to be supplied and the volume of gas containing chloride after decomposition. For example, when the amount of gas containing chlorine after decomposition within a unit time is constant, as the amount of alkaline solution to be supplied is reduced, the chlorine concentration of the solution to be supplied to the chlorine gas generation vessel 11 can be increased. This means that a large amount of chlorine can be supplied with a small amount of solution.

However, when the apparatus is continuously operated, and the effective chlorine concentration of the solution in the chlorine gas generation vessel 11 falls short of the required level, a hypochlorite solution may be supplied to compensate for the shortage. A chlorine supply unit 61 supplies chlorine such as hypochlorite to the chlorine gas generation vessel 11.

When the solution in the chlorine trapping unit 31 contains sodium hydroxide, chlorine is trapped according to the following formula:

$$Cl_2 + 2NaOH \rightarrow NaClO + NaCl + H_2O$$

Since substantially no chlorine is consumed in the decomposition in the reaction apparatus 5, about half of the chlorine in the chlorine trapping unit 31 becomes to be NaClO. The NaClO can be used again for generating chlorine within the chlorine gas generation vessel 11. A shortage of chlorine can be supplemented by the chlorine supply unit 61 that supplies chlorine such as hypochlorite.

However, there may be occasions where chlorine may be discharged from the target substances to be degraded in the decomposition within the reaction apparatus 5. Depending on the concentration of such chlorine, the supply amount of chlorine that may derive from hypochlorite to be supplied from the chlorine supply unit 6 can be reduced.

In the above descriptions, an alkaline solution is supplied to the chlorine trapping unit 31 through the alkaline solution supply unit 51 at a constant rate, and alkaline water containing chlorine is continuously supplied to the chlorine gas generation vessel 11 at an optional flow rate. However, the water containing chlorine may be intermittently supplied to the chlorine gas generation vessel 11.

The sixth embodiment example of the present invention is experimentally confirmed using a system indicated in FIG. 6.

A glass column having a volume of 400 mL was used as the reaction apparatus 5. 150 mL of chlorine solution (functional water (I)) is placed in a glass bottle as the chlorine gas generation vessel 11.

The chlorine solution (functional water (I)) was prepared with hydrochloric acid and sodium hypochlorite. More specifically, 0.25 mL of 12% of sodium hypochlorite solution (containing about 12% at the time of manufacturing, effective chlorine: min 5%, a product of Kishida Chemical) was added to 100 mL of source water, and 1.0 mL of hydrochloric acid (35% hydrochloric acid) was added to 100 mL of source water. As a result, the chlorine solution (functional water (I)) had pH 2.5 and residual chlorine concentration of 210 mg/L. Continuous decomposition experiment was started with the chlorine solution thus prepared.

The generated gas was irradiated with light from the light irradiation unit 4, a black light fluorescent lamp (20 W, trade name: FL:20S, BLB, a product of Toshiba), during which the intensity of irradiation was 0.4 to 0.7 mW/cm$^2$. Although, the figure shows that the light irradiation unit 4 is located inside the reaction apparatus, the light was irradiated from outside the glass column toward the inside the reaction apparatus in the experiment.

Simultaneously with the irradiation of light, polluted air containing TCE at a concentration of 160 ppm by volume and dichloromethane at a concentration of 40 ppm by volume, which was produced by using a permeator (a product of Gastec), was blown into the chlorine solution in the chlorine gas generation vessel 11 at a rate of 300 mL/min. Also, air is blown in the chlorine gas generation vessel 11 at a flow rate of 150 mL/min.

For 30 minutes after the operation of the apparatus was started, concentrations of TCE and dichloromethane in the exhausted air from the reaction apparatus were periodically sampled at a sampling port 35 by using a gas-tight syringe, and the concentrations of TCE and dichloromethane were measured by gas chromatography (GC-14B: trade name, a product of Shimadzu Seisakusho with an FID detector; DB-624 column: trade name, a product of J&W Inc.), but none of them was detected. Also, after the operation is stopped, concentrations of TCE and dichloromethane in the discharged chlorine solution were measured, but none of them was detected. As a result, it was shown that TCE and dichloromethane could be decomposed.

Also, the chlorine concentration after decomposition reaction was measured at the exhaust pipe 32 by using a detector tube at the sampling port 35, and found to be about 150 ppm by volume.

The gas that was discharged from the exhaust pipe 6 was injected into 120 mL of alkaline solution containing sodium hydroxide having pH 11.2 within the chlorine trapping unit 31. Chlorine concentration was measured at the exhaust in pipe 32 several times by a detector tube (No. 8H: trade name, a product of Gastec), and found to be 0.5 ppm by volume or less in any of the measurements.

The alkaline solution containing sodium hydroxide was supplied from the alkaline solution supply unit 51 at a rate of 2 mL/min, and discharged from the pipe 26 at a rate of 2 mL/min. However, at this moment, the pipe 26 was not connected to the chlorine gas generation vessel 11.

The above state was maintained and, when the operation of the apparatus was continued for 90 minutes, the pH value and the chlorine concentration of the alkaline solution in the chlorine trapping unit 31 were measured. The measured pH value was 10.4 and the residual chlorine concentration was 92 mg/L. Then, the gas supply from the permeator was stopped, the pipe 26 was connected to the chlorine gas generation vessel 11 as shown in FIG. 6, to thereby send the alkaline solution containing chlorine from the chlorine trapping unit 31 to the chlorine gas generation vessel 11.

By using the acid supplying unit 33, an acid (3.5%) was added in the chlorine solution to adjust the pH value of the chlorine solution to be between 2.1 and 2.9.

Also, a solution containing sodium hypochlorite was added to the chlorine gas generation vessel 11 at a rate of 0.2 mg/min from the chlorine supply unit 61 in order to supply chlorine in the form of sodium hypochlorite in the amount corresponding to the shortfall.

The gas supply from the permeator was started again, and decomposition reaction was performed again by using the chlorine solution (functional water (II)) generated from chlorine recovered from the chlorine trapping unit. It was confirmed that a decomposing capability similar to that of the previous solution was maintained.

Even when the above described process was repeated, the decomposing capability was not lowered. Also, it was confirmed that air containing chlorine that is necessary for decomposition can be produced repeatedly by continuously supplying chlorine contained in a gas after reaction and collected with an alkaline solution to the chlorine gas generation vessel to obtain an optional chlorine concentration and by adjusting the pH value of the chlorine solution. Furthermore, it was confirmed that, by using chlorine thus generated, the decomposition can be continuously progressed.

Embodiment Example 7

In the sixth embodiment example, a solution containing sodium hypochlorite was added to the chlorine gas generation vessel 11 from the chlorine supply unit 61 in order to compensate for the shortfall of chlorine. However, in accordance with a seventh embodiment example, the chlorine concentration of the alkaline solution in the chlorine trapping unit 31 is always maintained constant. The chlorine solution recovered by the trap is continuously supplied to generate chlorine gas necessary for a decomposition process.

Figure 7:
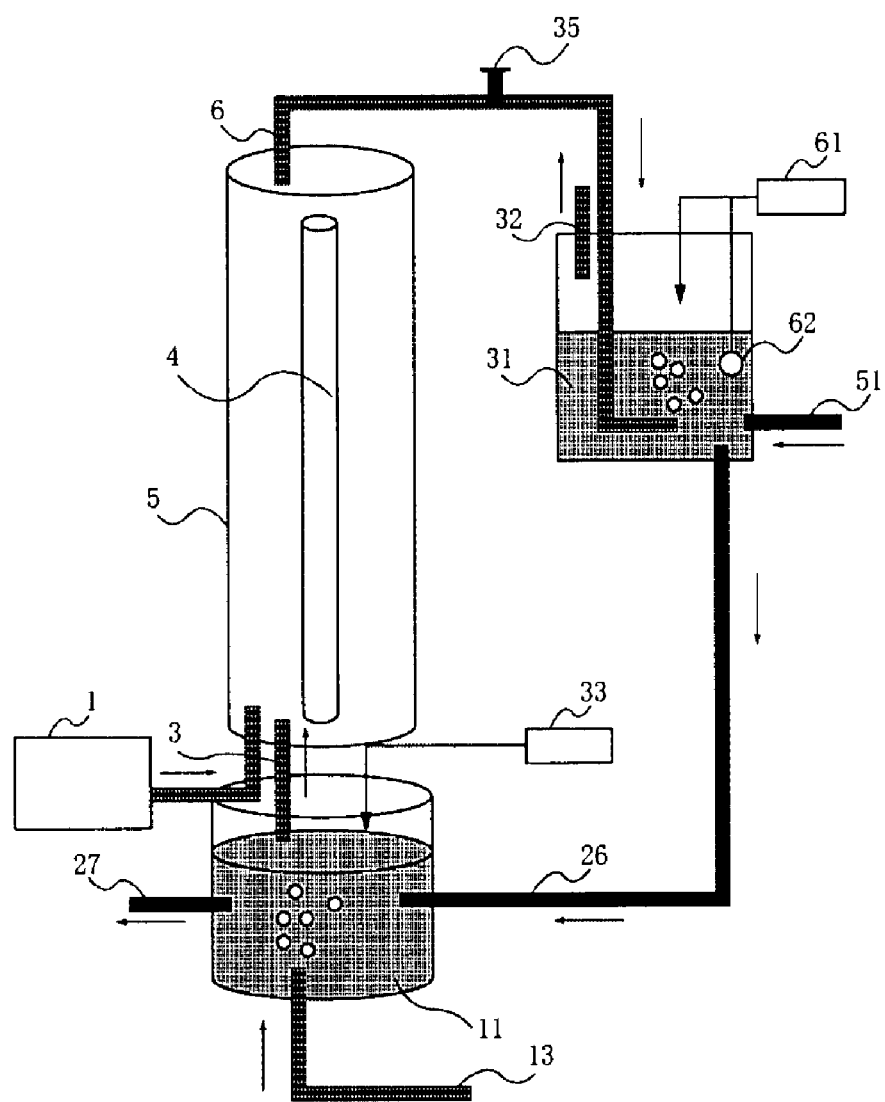
FIG. 7 is a schematic diagram of a decomposing apparatus for decomposing substances to be degraded in accordance with a sixth embodiment of the present invention.

FIG. 7 is a schematic diagram of the sixth embodiment example having a system structure which is substantially the same as the system shown in FIG. 6 except a chlorine supply unit 61 and a chlorine concentration detector unit 62.

The chlorine concentration detector unit 62 is provided to measure chlorine concentrations of an alkaline solution in the chlorine trapping unit 31 that recovers chlorine after reactions. To maintain the chlorine concentration constant and compensate for a shortfall of chlorine, a solution containing, for example, sodium hypochlorite is supplied from the chlorine supply unit 61. By this, the solution in an amount required to maintain the chlorine concentration constant is always sent through a pipe 26 to the chlorine gas generation vessel 11.

The chlorine concentration detector unit 62 to measure the chlorine concentration of the solution may be of any type; for example, any of known technologies such as an electrochemical sensor, a light absorption or the like can be used for the purpose of the present invention. Based on the measurements, the amount of chlorine to be supplied (the amount of solution including chlorine to be supplied) is controlled.

Embodiment Example 8

Figure 8:
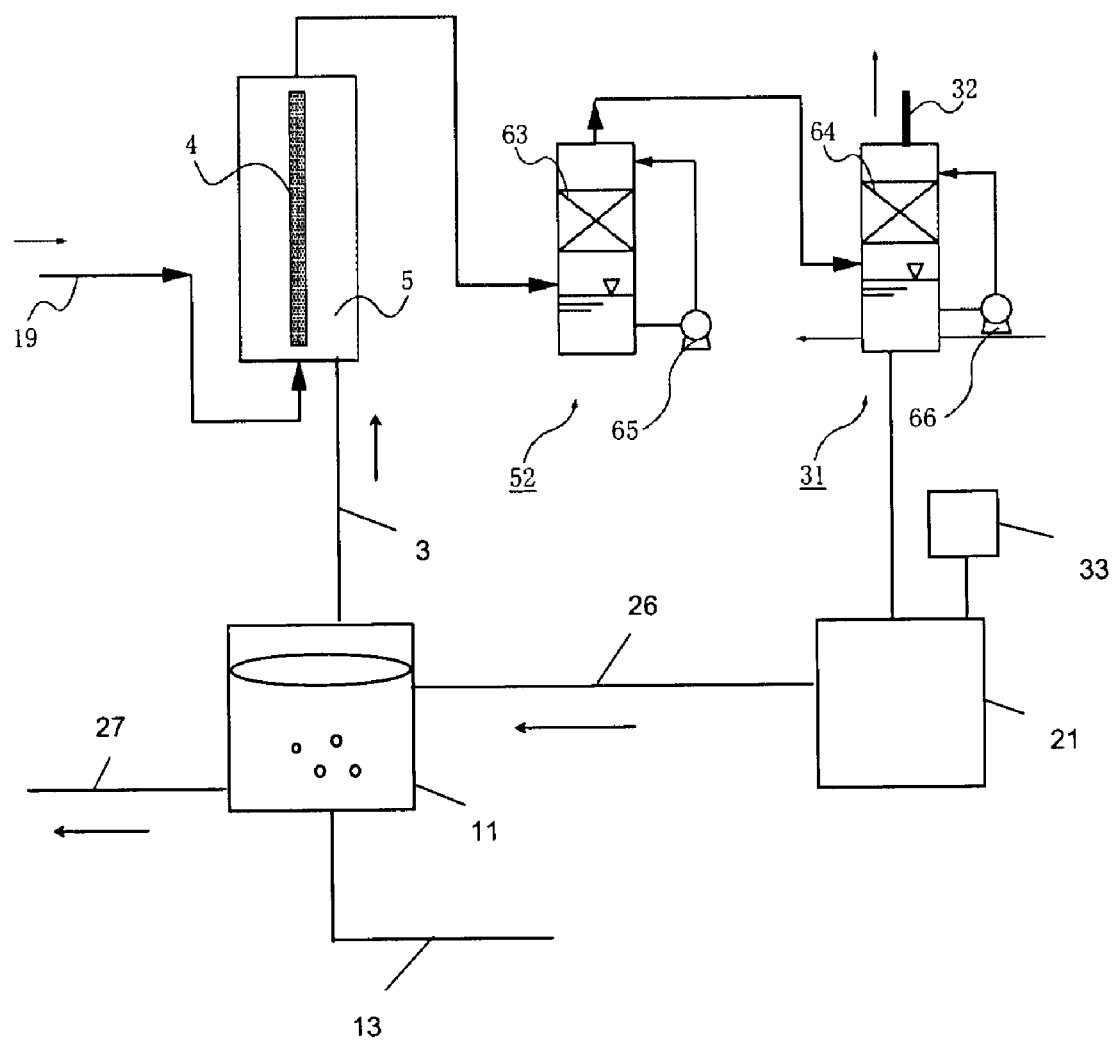
FIG. 8 is a schematic diagram of a decomposing apparatus of a first example in accordance with another embodiment of the present invention.

FIG. 8 is a schematic diagram of a system in accordance with an eighth embodiment example of the present invention. In this example, a first trap using an acidic solution and a second trap for trapping chlorine are provided. Referring to FIG. 8, a reaction vessel 5 is connected to a supply pipe 19 that supplies gaseous organochlorine compounds including target substances to be degraded. For example, gases that are vacuum-aspirated from polluted soils are supplied through the supply pipe 19 to the reaction vessel 5. A light irradiation unit 4 is provided at the reaction vessel 5 to form a decomposition section. A generation unit 11 that generates air containing chlorine gas (i.e., a chlorine gas generation vessel) may be connected to the supply pipe 19. In the present example, the chlorine solution is used as the chlorine gas generation unit 11. In the present example, the light irradiation unit 4 uses a black light fluorescent lamp which does not generate light having wavelengths less than 300 nm, and therefore the generation unit 11 that generates air containing chlorine gas (i.e., a chlorine gas generation vessel) is required. However, if light having a wavelength of 254 nm is used for a decomposition process, the generation unit 11 that generates air containing chlorine gas (i.e., a chlorine gas generation vessel) may not be necessary.

Reference numeral 52 denotes an acidic substance trapping unit, which is a gas-liquid contact tower including a filling material 63 in the present example. Gases that have been irradiated with light and decomposed are introduced in the acidic substance trapping unit (gas-liquid contact tower) 52. A liquid within the gas-liquid contact tower is circulated by a pump 65. The solution is discharged into the top section of the gas-liquid contact tower, flows down through the filling material where gas-liquid contacts are mainly promoted, and drops in a reservoir section at the bottom section of the gas-liquid contact tower 52, during which acidic substances may be produced in decomposition process. The produced acidic substance is processed by a solution section in a similar manner as described in the third embodiment example.

Since the solution is circulated in the acidic substance trapping unit 52, the concentration of the acidic substances in the solution increases. Chlorine included in the gases after decomposition contacts the solution in the acidic substance trapping unit 52, but almost the entire chlorine does not remain in the solution and discharged because the solution is acidic.

The gases containing chlorine discharged are sent to a chlorine trapping unit 31, where the gases contact an alkaline solution (for example, a sodium hydroxide solution), and the chlorine is trapped by the solution. Then, purified gases are discharged through a discharge pipe 32.

The chlorine trapping unit 31 has a structure similar to that of the acidic substance trapping unit 52. More specifically, the absorbent solution is circulated by a pump 66, and gas-liquid contacts are promoted in a packed material 64. However, the chlorine trapping unit 31 is provided with a supply pipe and a discharge pipe for controlling the chlorine concentration of the solution (e.g., for in preventing the chlorine concentration of the solution from increasing). The solution trapped the chlorine in the chlorine trapping unit 31 is sent to the chlorine gas generation unit 11. The apparatus of the present example may be understood to be an apparatus that decomposes environmentally harmful gases and coverts them into a solution that can be readily handled. From this point of view, the present example, which can liquefy environmentally harmful gases with a reduced energy consumption and decompose environmentally harmful substances, is superior over the conventional apparatus in which environmentally harmful gases are adsorbed with activated carbons that are subject to water-vapor desorption to recover the harmful substances in a solution. According to the concept of the apparatus of the present example, the concentration of decomposed products, for example, halo-acetic acid in the trapped solution in the acidic substance trapping unit 52 can reach several ten %.

The present example in accordance with the present invention is experimentally confirmed as follows.

Polluted gases, which contain target substances to be degraded that are vacuum-aspirated from soils polluted with organochlorine compounds by a vacuum suction pump, were blown into a photolysis processing vessel at a rate of 1 m$^3$/min (retention time: 30 seconds). Main polluting substances in the polluted gases were trichloroethylene and tetrachloroethylene, and their concentrations were 5 to 20 ppm by volume and 5 to 30 ppm by volume, respectively. Chlorine was supplied from the chlorine gas generation unit 11 to adjust the chlorine concentration within the reaction vessel 5 to be 50 ppm by volume.

Although FIG. 8 shows that the light irradiation unit 4 is located inside the reaction apparatus, the light was irradiated in the experiment from outside the reaction vessel 5 by sixteen commercially available black light fluorescent lamps (trade name: FL:40S, BLB, a product of Toshiba). Side surfaces of the reaction vessel are formed with fluoride-contained resin films, which were confirmed to transmit light having wavelengths of 300 nm or greater.

To know concentrations of trichloroethylene and tetrachloroethylene in the exhausted air from the photolysis processing section, the exhausted air was periodically sampled since the operation of the apparatus was started by using a gas-tight syringe, and the concentrations of trichloroethylene and tetrachloroethylene were measured by gas chromatography (CC-14B: trade name, a product of Shimadzu Seisakusho with an FID detector; DB-624 column: trade name, a product of J&W Inc.), but none of them was detected in any of the measurements.

About 70 L of tap water was stored in the gas-liquid contact tower for absorbing decomposed products, which corresponds to the acidic substance trapping unit 52, and the water was circulated by the pump 65.

The stored liquid is circulated and absorbs halo-acetic acid that is a decomposition product at the gas-liquid contact section where the filling material 63 is provided.

After the apparatus was operated for one month, the concentration of halo-acetic acid in the stored liquid reached 3.7%.

In the present example, since tap water was used as the solution in the acidic substance trapping unit 52, the pH value of the solution at the start of operation of the photolysis processing apparatus was about neutral. However, as the decomposition progressed, the acidic substance that is a decomposition product accumulated, which lowered the pH value of the solution, and eventually made the solution to be acidic.

For this reason, the major part of chlorine contained in the gases after having subjected to the photolysis processing was discharged without remaining in the acidic substance trapping unit 52.

The discharged gases containing chlorine is sent to the second gas-liquid contact tower, which corresponds to the chlorine trapping unit 31. About 70 L of a 5% sodium hydroxide solution was stored in the second gas-liquid contact tower. A part of the solution is circulated by the pump 66, and another part of the solution is discharged. A 5% sodium hydroxide solution in an amount equal to the discharged amount is compensated such that the chlorine absorbing capability of the solution does not lower.

Furthermore, it was confirmed that, by continuously circulating the solution within the gas-liquid contact tower for absorbing decomposed products, which corresponds to the acidic substance trapping unit 52, without discharging the solution, the concentration of the halo-acetic acid in the absorption solution increased.

With the system described above, it was confirmed that polluting gases that are widely present in soils can be converted into a state being a small amount of solution that cab be easily handled.

Embodiment Example 9

In the embodiment example 8, decomposition products are stored in the solution in the acidic substance trapping unit 52. However, the present embodiment example is further equipped with a decomposition unit 70 connected to the acidic substance trapping unit 52. Other parts of the structure of the present embodiment example are generally the same as those of the eighth embodiment example.

Figure 9:
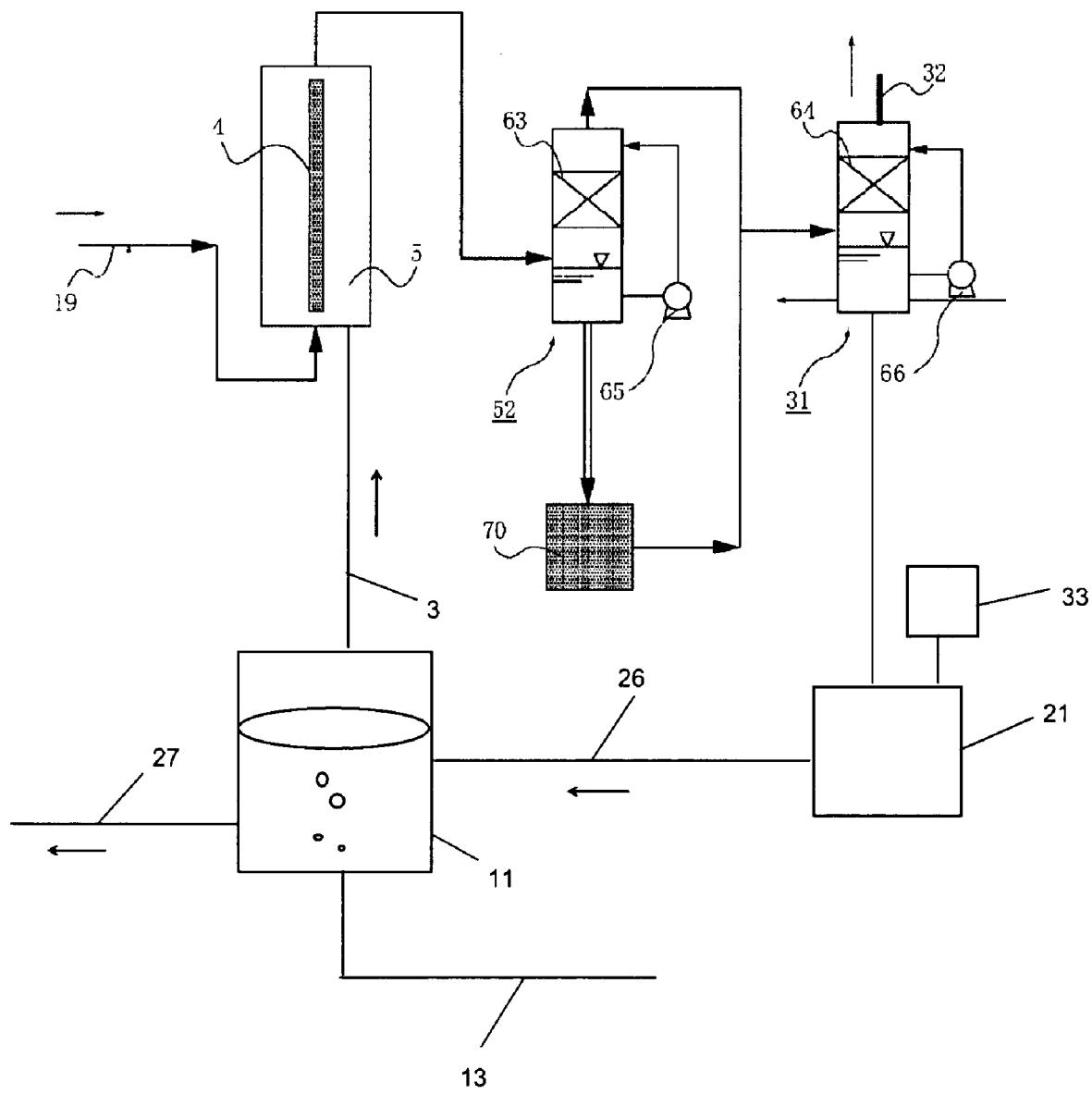
FIG. 9 is a schematic diagram of a decomposing apparatus of a second example in accordance with another embodiment of the present invention.

The decomposition unit 70 may use any of a variety of decomposing techniques such as a microbial decomposition process, electrolysis process, catalytic decomposition process, thermal decomposition process, incineration process or the like. In many of the decomposition processes, the decomposition efficiency increases with higher concentrations of contaminants. FIG. 9 shows an example that uses an incineration process as the decomposition unit 70. Exhaust gases caused by the incineration process are purified by a chlorine trapping unit 31. The liquid does not need to be continuously transferred from the acidic substance trapping unit 52 to the decomposition unit 70. Preferably, when the photolysis has been performed for a certain period and the concentration of decomposition products, for example, halo-acetic acid in the acidic substance trapping unit 52 reaches several ten %, the entire liquid in the acidic substance trapping unit 52 may be transferred to the decomposition unit 70 and incinerated.

The methods of the present invention proved to be effective in minimizing the deteriorating influences on the natural environment because resources can be effectively utilized by reusing chlorine gas, and an external discharge of chlorine gas can be suppressed.

Since the present invention has been conceived on the premise that chlorine is recovered for reuse, an unstable reaction under a minimum amount of chlorine required for the reaction does not need to be progressed, but the decomposition can be stably progressed with a relatively excessive amount of chlorine.

Furthermore, the amount of chlorine can be increased relatively to the concentration of contaminants, the methods of the present invention proved to be effective in purifying polluted gases of a low concentration of contaminants.

Also, the present invention proved that apparatuses that successively perform the methods described above and serve the purpose of the present invention.

Also, environmentally harmful gases can be decomposed, and converted with a process that consumes fewer energy into a state of solution that can be easily handled.

What is claimed is:

1. A method of treating substances to be degraded, comprising the steps of:
    irradiating a mixed gas containing chlorine and the substances to be degraded with light for decomposing the substance to be degraded;
    contacting a gas containing chlorine obtained after the step of decomposing the substances to be degraded with an alkaline solution;
    desorbing chlorine trapped in the alkaline solution in the step of contacting; and
    using the chlorine desorbed in the step of desorbing again in the step of decomposing.

2. A method according to claim 1, wherein the mixed gas is obtained by mixing chlorine generated from a liquid containing chlorine and the substances to be degraded.

3. A method according to claim 2, wherein the chlorine generated from the liquid containing chlorine is obtained by contacting the liquid containing chlorine with air.

4. A method according to claim 2, wherein a hypochlorite solution is added to the liquid containing chlorine for generating the chlorine, to thereby adjust a chlorine concentration of the liquid containing chlorine.

5. A method according to claim 1, wherein the mixed gas is irradiated with the light to generate chlorine radicals.

6. A method according to claim 1, further comprising the step of adding one of an inorganic acid and an organic acid to the alkaline solution containing chlorine obtained after the step of contacting to adjust a hydrogen ion concentration of the alkaline solution.

7. A method according to claim 1, wherein the substances to be degraded are organochlorine compounds.

8. A method according to claim 1, wherein the amount of the alkaline solution to be contacted with the chlorine obtained after the step of decomposition is adjusted to adjust a chlorine concentration of the alkaline solution after the step of contacting.

* * * * *

UNITED STATES PATENT AND TRADEMARK OFFICE
CERTIFICATE OF CORRECTION

PATENT NO. : 7,018,514 B2
APPLICATION NO. : 10/292402
DATED : March 28, 2006
INVENTOR(S) : Kinya Kato et al.

It is certified that error appears in the above-identified patent and that said Letters Patent is hereby corrected as shown below:

ON COVER PAGE AT (56) FOREIGN PATENT DOCUMENTS

"51031673" should read --51-31673--;
"53148167" should read --53-148167--.

COLUMN 1

Line 16, "methano," should read --methane,--.

COLUMN 2

Line 10, "generate" should read --generates--;
Line 14, "to" should be deleted;
Line 15, "be" should be deleted; and
Line 36, "substance" should read --substances--.

COLUMN 7

Line 45, "chloroethylen," should read --chloroethylene,--.

COLUMN 8

Line 11, "human," should read --humans,--;
Line 26, "redials" should read --radicals--; and
Line 28, "reacts" should read --react--.

COLUMN 9

Line 6, "an" should be deleted;
Line 7, "exhaust" should read --exhaust or discharge--;
Line 61, "fewer" should read --smaller--; and
Line 62, "fewer" should read --smaller--.

COLUMN 10

Line 3, "fewer" should read --smaller--; and
Line 4, "fewer" should read --smaller--.

UNITED STATES PATENT AND TRADEMARK OFFICE
CERTIFICATE OF CORRECTION

PATENT NO.        : 7,018,514 B2
APPLICATION NO. : 10/292402
DATED             : March 28, 2006
INVENTOR(S)       : Kinya Kato et al.

It is certified that error appears in the above-identified patent and that said Letters Patent is hereby corrected as shown below:

COLUMN 11

Line 59, "is" should read --are--.

COLUMN 12

Line 66, "in the inside" should read --the inside of--.

COLUMN 13

Line 18, "is" should read --was--.

COLUMN 14

Line 12, "is" should read --are--;
Line 16, "is" should read --are--;
Line 18, "is" should read --are--; and
Line 49, "to be" should be deleted; and "loose" should read --loses--.

COLUMN 15

Line 51, "becomes" should read --comes--.

COLUMN 17

Line 9, "to be" should read --was--.

COLUMN 19

Line 28, "predetermine" should read --predetermined--;
Line 57, "becomes to be" should read --becomes a part of--; and
Line 58, "The" should be deleted.

COLUMN 24

Line 23, "cab" should read --can--.

UNITED STATES PATENT AND TRADEMARK OFFICE
CERTIFICATE OF CORRECTION

PATENT NO. : 7,018,514 B2
APPLICATION NO. : 10/292402
DATED : March 28, 2006
INVENTOR(S) : Kinya Kato et al.

It is certified that error appears in the above-identified patent and that said Letters Patent is hereby corrected as shown below:

COLUMN 25

Line 5, "fewer" should read --less--; and.
Line 12, "substance" should read --substances--.

Signed and Sealed this

Fourteenth Day of November, 2006

JON W. DUDAS
*Director of the United States Patent and Trademark Office*